US010833760B2

(12) United States Patent
Liu et al.

(10) Patent No.: US 10,833,760 B2
(45) Date of Patent: Nov. 10, 2020

(54) COVERAGE ENHANCEMENT MODE SWITCHING FOR WIRELESS COMMUNICATIONS USING SHARED RADIO FREQUENCY SPECTRUM

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/531,538

(22) Filed: Aug. 5, 2019

(65) Prior Publication Data

US 2019/0386737 A1 Dec. 19, 2019

Related U.S. Application Data

(63) Continuation of application No. 15/919,127, filed on Mar. 12, 2018, now Pat. No. 10,411,795.

(Continued)

(51) Int. Cl.
*H04W 72/00* (2009.01)
*H04B 7/26* (2006.01)
(Continued)

(52) U.S. Cl.
CPC ........... *H04B 7/2606* (2013.01); *H01Q 1/246* (2013.01); *H04B 7/0491* (2013.01);
(Continued)

(58) Field of Classification Search
CPC .... H04B 7/2606; H04B 7/0491; H04B 48/18; H04W 4/70; H04W 8/005; H04W 16/14;
(Continued)

(56) References Cited

U.S. PATENT DOCUMENTS 8,566,780 B2 * 10/2013 Tolskyakov ........... G06Q 30/00
717/104
8,588,780 B2 * 11/2013 Sebire ............... H04W 36/0055
455/436

(Continued)

FOREIGN PATENT DOCUMENTS

EP 3101937 A1 12/2016
WO WO2015116870 A1 8/2015
(Continued)

OTHER PUBLICATIONS

International Search Report and Written Opinion—PCT/US2018/022224—ISA/EPO—dated Jul. 24, 2018.
(Continued)

*Primary Examiner* — Danh C Le
(74) *Attorney, Agent, or Firm* — Qualcomm Incorporated

(57) ABSTRACT

Described techniques provide for switching a user equipment (UE) between different coverage enhancement (CE) modes, such as between a non-CE mode and a CE mode. A UE may determine that a CE mode switch is to be performed and may initiate the mode switching. The UE may compare signal qualities of signals from one or more base stations against one or more threshold values and determine that a switch from a CE mode to a non-CE mode, or from a non-CE to CE mode, is to be performed. In some cases, a UE may be in idle mode and switch between CE modes, or may perform a cell reselection to a different base station. In other cases, a UE may be in connected mode and may declare a radio link failure to initiate a mode switch. A base station may initiate mode switching based on radio link monitoring of UEs.

12 Claims, 21 Drawing Sheets

Related U.S. Application Data

(60) Provisional application No. 62/471,312, filed on Mar. 14, 2017.

(51) Int. Cl.

| | | |
|---|---|---|
| H01Q 1/24 | (2006.01) | |
| H04B 7/0491 | (2017.01) | |
| H04W 72/08 | (2009.01) | |
| H04W 16/24 | (2009.01) | |
| H04W 8/00 | (2009.01) | |
| H04W 16/14 | (2009.01) | |
| H04W 4/70 | (2018.01) | |
| H04W 36/30 | (2009.01) | |
| H04B 7/06 | (2006.01) | |
| H04W 36/06 | (2009.01) | |
| H04W 48/18 | (2009.01) | |
| H04W 88/04 | (2009.01) | |
| H04W 74/08 | (2009.01) | |
| H04W 88/06 | (2009.01) | |

(52) U.S. Cl.
CPC ............ *H04B 7/0689* (2013.01); *H04W 4/70* (2018.02); *H04W 8/005* (2013.01); *H04W 16/14* (2013.01); *H04W 16/24* (2013.01); *H04W 36/06* (2013.01); *H04W 36/305* (2018.08); *H04W 48/18* (2013.01); *H04W 72/082* (2013.01); *H04W 74/08* (2013.01); *H04W 88/04* (2013.01); *H04W 88/06* (2013.01)

(58) Field of Classification Search
CPC ... H04W 16/24; H04W 36/06; H04W 72/082; H04W 88/04; H01Q 1/246
USPC .............. 455/450, 436, 418, 550.1; 370/331
See application file for complete search history.

(56) References Cited

U.S. PATENT DOCUMENTS

| | | | |
|---|---|---|---|
| 2009/0170437 A1* | 7/2009 | Bhattad | H04L 1/0026 455/63.1 |
| 2010/0003979 A1* | 1/2010 | Iwamura | H04L 1/0025 455/436 |
| 2010/0260147 A1 | 10/2010 | Xing et al. | |
| 2011/0034169 A1 | 2/2011 | Roberts et al. | |
| 2013/0095820 A1 | 4/2013 | Yasuda | |
| 2014/0098761 A1* | 4/2014 | Lee | H04W 72/005 370/329 |
| 2015/0029955 A1* | 1/2015 | Heo | H04B 7/0695 370/329 |
| 2015/0085717 A1 | 3/2015 | Papasakellariou et al. | |
| 2016/0057800 A1* | 2/2016 | Ingale | H04W 76/18 370/216 |
| 2016/0192376 A1* | 6/2016 | Lee | H04W 72/0406 370/252 |
| 2016/0337085 A1 | 11/2016 | Yu et al. | |
| 2016/0337961 A1 | 11/2016 | Hu et al. | |
| 2017/0105166 A1* | 4/2017 | Lee | H04W 68/005 |
| 2017/0135005 A1* | 5/2017 | Basu Mallick | H04B 17/318 |
| 2017/0135012 A1* | 5/2017 | Zhang | H04W 48/16 |
| 2017/0230868 A1 | 8/2017 | Matsuo | |
| 2017/0257874 A1* | 9/2017 | Ma | H04W 48/20 |
| 2017/0280481 A1 | 9/2017 | Stern-Berkowitz et al. | |
| 2017/0311284 A1* | 10/2017 | Basu Mallick | H04W 68/02 |
| 2017/0374574 A1* | 12/2017 | Lee | H04W 16/24 |
| 2018/0097541 A1* | 4/2018 | Bhattad | H04B 1/713 |
| 2018/0098266 A1* | 4/2018 | Futaki | H04L 5/0053 |
| 2018/0269962 A1 | 9/2018 | Liu et al. | |
| 2018/0302821 A1* | 10/2018 | Gustafsson | H04W 76/28 |
| 2018/0332566 A1* | 11/2018 | You | H04W 74/08 |
| 2019/0045575 A1* | 2/2019 | Huang | H04W 76/27 |

FOREIGN PATENT DOCUMENTS

| | | |
|---|---|---|
| WO | WO2015117028 A1 | 8/2015 |
| WO | WO2017024526 A1 | 2/2017 |
| WO | WO2017026986 A1 | 2/2017 |

OTHER PUBLICATIONS

Partial International Search Report—PCT/US2018/022224—ISA/EPO—dated Jun. 8, 2018.

* cited by examiner

COVERAGE ENHANCEMENT MODE SWITCHING FOR WIRELESS COMMUNICATIONS USING SHARED RADIO FREQUENCY SPECTRUM

CROSS REFERENCES

The present Application for Patent is a Continuation of U.S. patent application Ser. No. 15/919,127 by LIU, et al., entitled, "Coverage Enhancement Mode Switching For Wireless Communications Using Shared Radio Frequency Spectrum" filed Mar. 12, 2018, which claims priority to U.S. Provisional Patent Application No. 62/471,312 by LIU, et al., entitled "Coverage Enhancement Mode Switching For Wireless Communications Using shared Radio Frequency Spectrum," filed Mar. 14, 2017, assigned to the assignee hereof and incorporated by reference herein.

BACKGROUND

The following relates generally to wireless communication, and more specifically to coverage enhancement mode switching for wireless communications using shared radio frequency spectrum.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

SUMMARY

The described techniques relate to improved methods, systems, devices, or apparatuses that support coverage enhancement wireless communication modes in shared radio frequency spectrum. Generally, the described techniques provide for switching a user equipment (UE) between different coverage enhancement (CE) modes, such as between a non-CE mode and a CE mode. In some cases, a UE may determine that a CE mode switch is to be performed and may initiate the mode switching. In some cases, the UE may compare signal qualities of signals from one or more base stations against one or more threshold values and determine that a switch from a CE mode to a non-CE mode, or from a non-CE mode to a CE mode, is to be performed. In some cases, a UE may be in idle mode and may switch between CE modes, or may perform a cell reselection to a different base station. In other cases, a UE may be in connected mode and may declare a radio link failure (RLF) to initiate a mode switch. In some cases, CE communications may have one set of random access procedure resources, and non-CE communications may have a different set of random access procedure resources, and a UE that switches from a non-CE mode to a CE mode may, upon being paged, use the CE mode random access resources for transmission of a random access request that is responsive to the page.

In some cases, a UE may transmit one or more measurement reports to a base station, and the base station may determine that mode switching is to be performed at the UE. In some cases, the base station may make such a determination based on radio resource management (RRM) measurement reports provided by the UE and one or more thresholds associated with CE and non-CE modes. In some cases, the base station may transmit a radio resource control (RRC) reconfiguration message to the UE to switch modes. In some cases, the base station may transmit a handover-like RRC reconfiguration message to the UE, and the UE may reestablish a connection with the base station in the new CE or non-CE mode. In some cases, the measurement reports from the UE may include one or more neighbor cell measurements, and the base station may determine that the UE is to be handed over to a neighboring base station and may determine a CE node or non-CE mode for the new connection. The base station may transmit a handover command to the UE, and may coordinate handover with the neighboring base station.

A method of for wireless communication is described. The method may include establishing a connection with a base station according to a non-CE mode, monitoring a channel quality of a radio link with the base station, and switching from the non-CE mode to a CE mode based at least in part on the channel quality of the radio link being below a threshold value for a first time period.

An apparatus for wireless communication is described. The apparatus may include means for establishing a connection with a base station according to a non-CE mode, means for monitoring a channel quality of a radio link with the base station, and means for switching from the non-CE mode to a CE mode based at least in part on the channel quality of the radio link being below a threshold value for a first time period.

Another apparatus for wireless communication is described. The apparatus may include a processor, memory in electronic communication with the processor, and instructions stored in the memory. The instructions may be operable to cause the processor to establish a connection with a base station according to a non-CE mode, monitor a channel quality of a radio link with the base station, and switch from the non-CE mode to a CE mode based at least in part on the channel quality of the radio link being below a threshold value for a first time period.

A non-transitory computer readable medium for wireless communication is described. The non-transitory computer-readable medium may include instructions operable to cause a processor to establish a connection with a base station according to a non-CE mode, monitor a channel quality of a radio link with the base station, and switch from the non-CE mode to a CE mode based at least in part on the channel quality of the radio link being below a threshold value for a first time period.

Some examples of the method, apparatus, and non-transitory computer-readable medium described above may further include processes, features, means, or instructions for determining, subsequent to the switching, that the channel quality of the radio link may be above the threshold value for a second time period. Some examples of the method, apparatus, and non-transitory computer-readable medium described above may further include processes, features, means, or instructions for switching, responsive to the determining that the channel quality of the radio link may be above the threshold value for a second time period, from the CE mode to the non-CE mode. In some examples of the method, apparatus, and non-transitory computer-readable medium described above, the non-CE mode may be preferred over the CE mode, and wherein the second time period may be selected to be shorter than the first time period.

In some examples of the method, apparatus, and non-transitory computer-readable medium described above, the monitoring the channel quality comprises monitoring a first reference signal associated with non-CE mode transmissions, and the determining that the channel quality of the radio link may be above the threshold value comprises monitoring a second reference signal associated with CE mode transmissions.

Some examples of the method, apparatus, and non-transitory computer-readable medium described above may further include processes, features, means, or instructions for determining, subsequent to the switching, that the channel quality of the radio link may be below a cell reselection threshold. Some examples of the method, apparatus, and non-transitory computer-readable medium described above may further include processes, features, means, or instructions for measuring a signal quality of one or more neighboring base stations.

In some examples of the method, apparatus, and non-transitory computer-readable medium described above, the measuring the signal quality comprises measuring a first signal quality of one or more non-CE mode reference signals of the neighboring base stations, and measuring a second signal quality of one or more CE mode reference signals of the neighboring base stations.

Some examples of the method, apparatus, and non-transitory computer-readable medium described above may further include processes, features, means, or instructions for determining to perform a reselection procedure to establish a non-CE mode connection with a first neighboring base station based at least in part on the first signal quality exceeding the channel quality of the radio link by a first offset value. Some examples of the method, apparatus, and non-transitory computer-readable medium described above may further include processes, features, means, or instructions for determining to perform a reselection procedure to establish a CE mode connection with the first neighboring base station based at least in part on the second signal quality exceeding the channel quality of the radio link by a second offset value. In some examples of the method, apparatus, and non-transitory computer-readable medium described above, the second offset value may be less than the first offset value.

In some examples of the method, apparatus, and non-transitory computer-readable medium described above, the switching comprises determining a radio link failure (RLF) may have occurred, and transmitting a random access request using random access resources associated with the CE mode to establish the CE mode connection. In some examples of the method, apparatus, and non-transitory computer-readable medium described above, the switching comprises transmitting a radio link failure (RLF) indication to the base station, and receiving a reconfiguration message from the base station to switch from the non-CE mode to the CE mode.

Some examples of the method, apparatus, and non-transitory computer-readable medium described above may further include processes, features, means, or instructions for initiating, subsequent to the transmitting the RLF indication, a reconfiguration timer. Some examples of the method, apparatus, and non-transitory computer-readable medium described above may further include processes, features, means, or instructions for transmitting, responsive to an expiration of the reconfiguration timer, a random access request using random access resources associated with the CE mode to establish the CE mode connection.

In some examples of the method, apparatus, and non-transitory computer-readable medium described above, the RLF indication may be transmitted in an uplink feedback transmission associated with a downlink transmission from the base station. In some examples of the method, apparatus, and non-transitory computer-readable medium described above, the RLF indication may be transmitted in a random access transmission using random access resources associated with the CE mode.

Some examples of the method, apparatus, and non-transitory computer-readable medium described above may further include processes, features, means, or instructions for receiving a paging message from the base station. Some examples of the method, apparatus, and non-transitory computer-readable medium described above may further include processes, features, means, or instructions for identifying a first subset of random access resources for non-CE mode random access transmission and a second subset of random access resources for CE mode random access transmissions. Some examples of the method, apparatus, and non-transitory computer-readable medium described above may further include processes, features, means, or instructions for selecting the first subset of random access resources or the second subset of random access resources for transmission of a random access request responsive to the paging message, based at least in part on whether the CE mode or the non-CE mode is to be used for transmissions. Some examples of the method, apparatus, and non-transitory computer-readable medium described above may further include processes, features, means, or instructions for transmitting the random access request to the base station using the selected random access resources.

A method of for wireless communication is described. The method may include establishing a connection with a base station according to a non-coverage enhancement (non-CE) mode, providing the base station with an indication of a channel quality of a radio link with the base station, and receiving an indication from the base station to reestablish the connection using a coverage enhancement (CE) mode based at least in part on the indication of the channel quality of the radio link.

An apparatus for wireless communication is described. The apparatus may include means for establishing a connection with a base station according to a non-coverage enhancement (non-CE) mode, means for providing the base station with an indication of a channel quality of a radio link with the base station, and means for receiving an indication from the base station to reestablish the connection using a coverage enhancement (CE) mode based at least in part on the indication of the channel quality of the radio link.

Another apparatus for wireless communication is described. The apparatus may include a processor, memory in electronic communication with the processor, and instructions stored in the memory. The instructions may be operable to cause the processor to establish a connection with a base station according to a non-coverage enhancement (non-CE) mode, provide the base station with an indication of a channel quality of a radio link with the base station, and receive an indication from the base station to reestablish the connection using a coverage enhancement (CE) mode based at least in part on the indication of the channel quality of the radio link.

A non-transitory computer readable medium for wireless communication is described. The non-transitory computer-readable medium may include instructions operable to cause a processor to establish a connection with a base station according to a non-coverage enhancement (non-CE) mode, provide the base station with an indication of a channel quality of a radio link with the base station, and receive an indication from the base station to reestablish the connection using a coverage enhancement (CE) mode based at least in part on the indication of the channel quality of the radio link.

Some examples of the method, apparatus, and non-transitory computer-readable medium described above may further include processes, features, means, or instructions for receiving a radio resource control (RRC) reconfiguration message to reconfigure the connection using the CE mode. Some examples of the method, apparatus, and non-transitory computer-readable medium described above may further include processes, features, means, or instructions for transmitting a RRC reconfiguration complete message to the base station upon completion of the RRC reconfiguration.

In some examples of the method, apparatus, and non-transitory computer-readable medium described above, the providing the base station with the indication of the channel quality comprises providing a measurement report to the base station that includes measurements associated with one or more of non-CE mode transmissions or CE mode transmissions of the base station.

In some examples of the method, apparatus, and non-transitory computer-readable medium described above, the measurement report may be provided to the base station periodically or based on a trigger received from the base station.

In some examples of the method, apparatus, and non-transitory computer-readable medium described above, the measurement report includes both CE mode measurements based at least in part on a first measurement window associated with CE mode transmissions and non-CE mode measurements based at least in part on a second measurement window associated with non-CE mode transmissions. In some examples of the method, apparatus, and non-transitory computer-readable medium described above, the non-CE mode measurements may have an associated first threshold value for switching from the non-CE mode to the CE mode, and the CE mode measurements may have an associated second threshold value for switching from the CE mode to the non-CE mode.

Some examples of the method, apparatus, and non-transitory computer-readable medium described above may further include processes, features, means, or instructions for receiving an uplink grant to transmit an uplink transmission using the CE mode that may be transmitted using both non-CE and CE control resources. Some examples of the method, apparatus, and non-transitory computer-readable medium described above may further include processes, features, means, or instructions for transmitting a RRC reconfiguration complete message to the base station.

Some examples of the method, apparatus, and non-transitory computer-readable medium described above may further include processes, features, means, or instructions for receiving a RRC reconfiguration message to establish a new connection with the base station using the CE mode. Some examples of the method, apparatus, and non-transitory computer-readable medium described above may further include processes, features, means, or instructions for initiating the new connection using the CE mode responsive to the RRC reconfiguration message.

A method of for wireless communication is described. The method may include establishing a first connection with a first base station according to a coverage enhancement (CE) mode or a non-CE mode, providing the first base station with an indication of a channel quality of a radio link with the first base station and one or more channel quality measurements for one or more neighboring base stations, the one or more neighboring base stations including a second base station, and receiving a handover command from the base station to establish a second connection with the second base station, the handover command indicating a CE mode or non-CE mode for the second connection.

An apparatus for wireless communication is described. The apparatus may include means for establishing a first connection with a first base station according to a coverage enhancement (CE) mode or a non-CE mode, means for providing the first base station with an indication of a channel quality of a radio link with the first base station and one or more channel quality measurements for one or more neighboring base stations, the one or more neighboring base stations including a second base station, and means for receiving a handover command from the base station to establish a second connection with the second base station, the handover command indicating a CE mode or non-CE mode for the second connection.

Another apparatus for wireless communication is described. The apparatus may include a processor, memory in electronic communication with the processor, and instructions stored in the memory. The instructions may be operable to cause the processor to establish a first connection with a first base station according to a coverage enhancement (CE) mode or a non-CE mode, provide the first base station with an indication of a channel quality of a radio link with the first base station and one or more channel quality measurements for one or more neighboring base stations, the one or more neighboring base stations including a second base station, and receive a handover command from the base station to establish a second connection with the second base station, the handover command indicating a CE mode or non-CE mode for the second connection.

A non-transitory computer readable medium for wireless communication is described. The non-transitory computer-readable medium may include instructions operable to cause a processor to establish a first connection with a first base station according to a coverage enhancement (CE) mode or a non-CE mode, provide the first base station with an indication of a channel quality of a radio link with the first base station and one or more channel quality measurements for one or more neighboring base stations, the one or more neighboring base stations including a second base station, and receive a handover command from the base station to establish a second connection with the second base station, the handover command indicating a CE mode or non-CE mode for the second connection.

Some examples of the method, apparatus, and non-transitory computer-readable medium described above may further include processes, features, means, or instructions for transmitting a random access request to the second base station based at least in part on the handover command using random access resources selected, based at least in part on the indication of CE mode or non-CE mode for the second connection, from CE mode random access resources or non-CE mode random access resources.

Some examples of the method, apparatus, and non-transitory computer-readable medium described above may further include processes, features, means, or instructions for receiving a random access response and uplink resource grant on a control channel associated with the respective CE mode transmissions or non-CE mode transmissions.

A method of for wireless communication is described. The method may include establishing, at a base station, a connection with a UE according to a non-CE mode, receiving, from the UE, an indication of a channel quality of a radio link between the UE and the base station, determining that the channel quality of the radio link is below a threshold value, and transmitting an indication to the UE to reestablish the connection using a CE mode based at least in part on the determining.

An apparatus for wireless communication is described. The apparatus may include means for establishing, at a base station, a connection with a UE according to a non-CE mode, means for receiving, from the UE, an indication of a channel quality of a radio link between the UE and the base station, means for determining that the channel quality of the radio link is below a threshold value, and means for transmitting an indication to the UE to reestablish the connection using a CE mode based at least in part on the determining.

Another apparatus for wireless communication is described. The apparatus may include a processor, memory in electronic communication with the processor, and instructions stored in the memory. The instructions may be operable to cause the processor to establish, at a base station, a connection with a UE according to a non-CE mode, receive, from the UE, an indication of a channel quality of a radio link between the UE and the base station, determine that the channel quality of the radio link is below a threshold value, and transmit an indication to the UE to reestablish the connection using a CE mode based at least in part on the determining.

A non-transitory computer readable medium for wireless communication is described. The non-transitory computer-readable medium may include instructions operable to cause a processor to establish, at a base station, a connection with a UE according to a non-CE mode, receive, from the UE, an indication of a channel quality of a radio link between the UE and the base station, determine that the channel quality of the radio link is below a threshold value, and transmit an indication to the UE to reestablish the connection using a CE mode based at least in part on the determining.

In some examples of the method, apparatus, and non-transitory computer-readable medium described above, the transmitting comprises transmitting a RRC reconfiguration message to reconfigure the connection using the CE mode, and receiving a RRC reconfiguration complete message from the UE upon completion of the RRC reconfiguration. In some examples of the method, apparatus, and non-transitory computer-readable medium described above, the receiving the indication of the channel quality comprises receiving a measurement report that includes measurements associated with one or more of non-CE mode transmissions or CE mode transmissions of the base station. In some examples of the method, apparatus, and non-transitory computer-readable medium described above, the measurement report may be provided to the base station periodically or based on a trigger transmitted from the base station.

In some examples of the method, apparatus, and non-transitory computer-readable medium described above, the measurement report includes both CE mode measurements based at least in part on a first measurement window associated with CE mode transmissions and non-CE mode measurements based at least in part on a second measurement window associated with non-CE mode transmissions.

In some examples of the method, apparatus, and non-transitory computer-readable medium described above, the non-CE mode measurements may have an associated first threshold value for switching from the non-CE mode to the CE mode, and the CE mode measurements may have an associated second threshold value for switching from the CE mode to the non-CE mode.

Some examples of the method, apparatus, and non-transitory computer-readable medium described above may further include processes, features, means, or instructions for transmitting an uplink grant for an uplink transmission using the CE mode, wherein the uplink grant may be transmitted using both non-CE and CE control resources until a RRC reconfiguration complete message may be received from the UE.

In some examples of the method, apparatus, and non-transitory computer-readable medium described above, the transmitting comprises transmitting a radio resource control (RRC) reconfiguration message to the UE to establish a new connection with the base station using the CE mode.

A method of for wireless communication is described. The method may include establishing, at a first base station, a first connection with a UE according to a CE mode or a non-CE mode, receiving, from the UE, an indication of a channel quality of a radio link with the first base station and one or more channel quality measurements for one or more neighboring base stations, the one or more neighboring base stations including a second base station, determining that the channel quality of the radio link is below a threshold value, and transmitting a handover command to the UE to establish a second connection with the second base station, the handover command indicating a CE mode or non-CE mode for the second connection.

An apparatus for wireless communication is described. The apparatus may include means for establishing, at a first base station, a first connection with a UE according to a CE mode or a non-CE mode, means for receiving, from the UE, an indication of a channel quality of a radio link with the first base station and one or more channel quality measurements for one or more neighboring base stations, the one or more neighboring base stations including a second base station, means for determining that the channel quality of the radio link is below a threshold value, and means for transmitting a handover command to the UE to establish a second connection with the second base station, the handover command indicating a CE mode or non-CE mode for the second connection.

Another apparatus for wireless communication is described. The apparatus may include a processor, memory in electronic communication with the processor, and instructions stored in the memory. The instructions may be operable to cause the processor to establish, at a first base station, a first connection with a UE according to a CE mode or a non-CE mode, receive, from the UE, an indication of a channel quality of a radio link with the first base station and one or more channel quality measurements for one or more neighboring base stations, the one or more neighboring base stations including a second base station, determine that the channel quality of the radio link is below a threshold value, and transmit a handover command to the UE to establish a second connection with the second base station, the handover command indicating a CE mode or non-CE mode for the second connection.

A non-transitory computer readable medium for wireless communication is described. The non-transitory computer-readable medium may include instructions operable to cause a processor to establish, at a first base station, a first connection with a UE according to a CE mode or a non-CE mode, receive, from the UE, an indication of a channel quality of a radio link with the first base station and one or more channel quality measurements for one or more neighboring base stations, the one or more neighboring base stations including a second base station, determine that the channel quality of the radio link is below a threshold value, and transmit a handover command to the UE to establish a second connection with the second base station, the handover command indicating a CE mode or non-CE mode for the second connection.

Some examples of the method, apparatus, and non-transitory computer-readable medium described above may further include processes, features, means, or instructions for determining, based at least in part on the one or more channel quality measurements for the one or more neighboring base stations, whether to indicate the CE mode or non-CE mode for the second connection.

DETAILED DESCRIPTION

Figure 1:
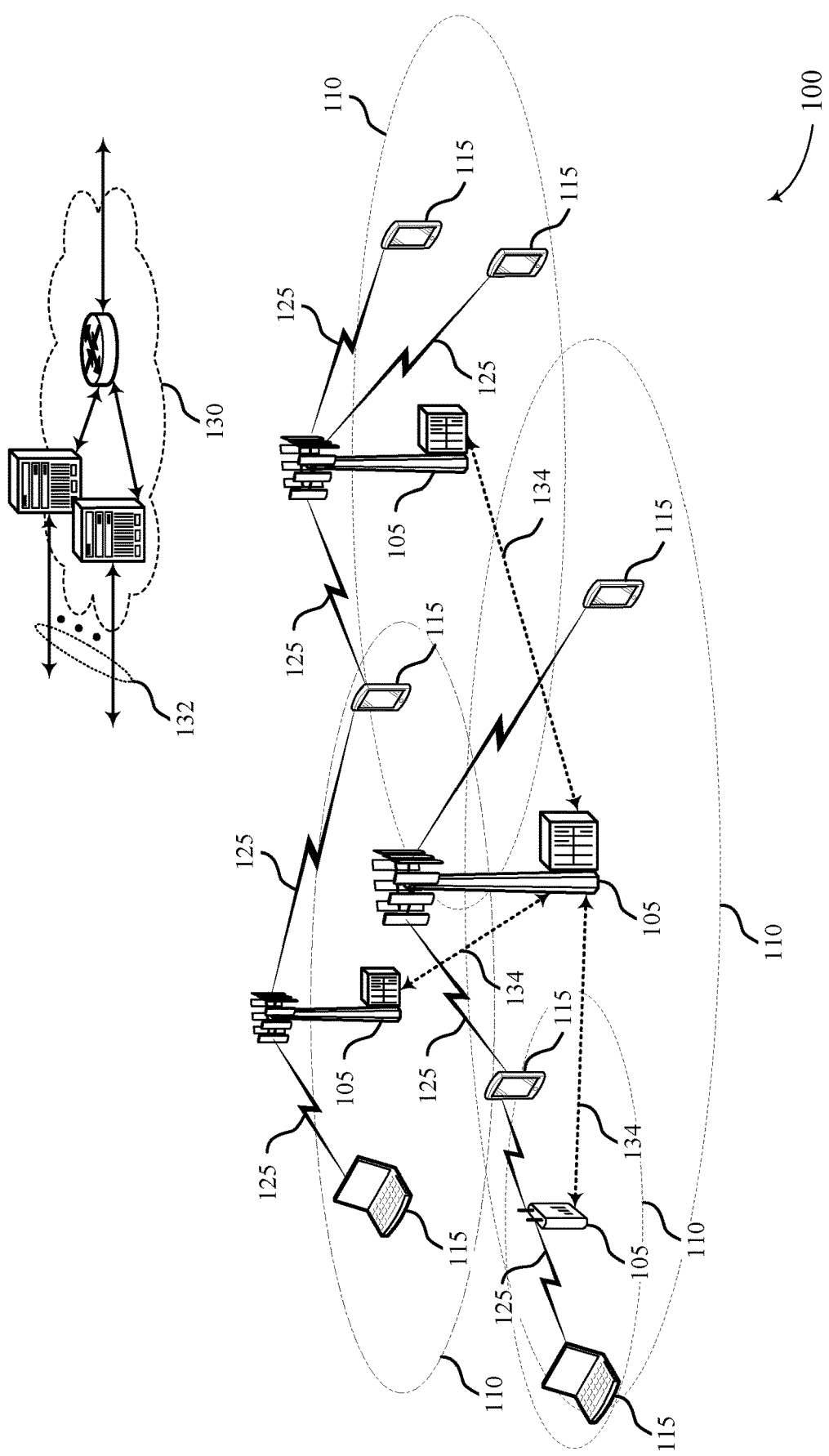
FIG. 1 illustrates an example of a system for wireless communication that supports coverage enhancement mode switching for wireless communications using shared radio frequency spectrum in accordance with aspects of the present disclosure.

The described techniques relate to improved methods, systems, devices, or apparatuses that support coverage enhancement (CE) techniques in unlicensed or shared radio frequency spectrum. One or more CE modes may be configured in a system, which may provide additional coverage relative to standard or non-CE transmissions through a number of techniques with one or more new controls or data channels, such as repetition of transmission in frequency/time, code blocks with lower code rates, power boosting, or combinations thereof. A user equipment (UE) experiencing relatively poor channel conditions may use a CE mode for communications with a base station to enhance the likelihood of successfully transmitting and receiving transmissions.

The described techniques provide for switching a user equipment (UE) between different CE modes, such as between a non-CE mode and a CE mode. In some cases, a UE may determine that a CE mode switch is to be performed and may initiate the mode switching. In some cases, the UE may compare signal qualities of signals from one or more base stations against one or more threshold values and determine that a switch from a CE mode to a non-CE mode, or from a non-CE mode to a CE mode, is to be performed. In some cases, a UE may be in idle mode and may switch between CE modes, or may perform a cell reselection to a different base station. In other cases, a UE may be in connected mode and may declare a radio link failure (RLF) to initiate a mode switch. In some cases, CE communications may have one set of random access procedure resources, and non-CE communications may have a different set of random access procedure resources. In such cases, a UE that switches from a non-CE mode to a CE mode may, upon being paged, use the CE mode random access resources for transmission of a random access request responsive to the page. The base station may identify that a UE is to connect using CE mode or non-CE mode based on the random access resource used by the UE.

In some cases, a UE may transmit one or more measurement reports to a base station, and the base station may determine that mode switching is to be performed at the UE. In some cases, the base station may make such a determination based on radio resource management (RRM) measurement reports provided by the UE and one or more thresholds associated with CE and non-CE modes. In some cases, the base station may transmit a radio resource control (RRC) reconfiguration message to the UE to switch modes. In some cases, the base station may transmit a handover-like RRC reconfiguration message to the UE, and the UE may reestablish a connection with the base station in the new CE or non-CE mode. In some cases, the measurement reports from the UE may include one or more neighbor cell measurements, and the base station may determine that the UE is to be handed over to a neighboring base station and may determine a CE mode or non-CE mode for the new connection. The base station may transmit a handover command to the UE, and may coordinate handover with the neighboring base station.

In some examples, unlicensed radio frequency spectrum bands may be used for wireless communication, such as Long Term Evolution (LTE) or LTE-Advanced (LTE-A) communications, for example. Unlicensed radio frequency spectrum may be used in combination with, or independent from, a dedicated or licensed radio frequency spectrum band. The dedicated radio frequency spectrum band may include a radio frequency spectrum band licensed to particular users for particular uses. The unlicensed or shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner. The terms unlicensed radio frequency spectrum and shared radio frequency spectrum are used interchangeably herein.

Transmissions in wireless communication systems utilizing unlicensed radio frequency spectrum may be commenced following initial system acquisition by a UE that is performed by acquiring one or more synchronization signals, determining a system timing and synchronization information and cell ID. Once the UE has synchronization information (e.g., slot and subframe synchronization) and the cell ID of a base station, the UE may read a system information block (SIB) transmitted by the base station. In some cases, transmitters may perform LBT routines, such as a clear channel assessment (CCA), to verify that no other transmitters are using a channel prior to starting transmissions.

In cases where a UE has relatively poor channel conditions, CE techniques may allow for increased reliability of communications. For example, in some Internet of Things (IoT) applications, various UEs may be located in areas having relatively poor coverage, and CE techniques may be employed for such UEs. Additionally, channel conditions for UEs may vary in time due to movement of the UE or other items or equipment in proximity to the UE. For example, a UE may be used for equipment or inventory tracking at a factory or at a job site, and a piece of equipment with a large penetration loss may be moved to a position that blocks the UE and negatively impacts channel conditions at the UE. CE techniques may be used to maintain coverage at the UE in such cases. When referring to CE and non-CE modes of communication herein, CE modes refer to modes that use repetition, power boosting, separate control channel transmissions, separate reference signal transmissions, lower code rates or combinations thereof, to enhance likelihood of successful transmissions. Non-CE modes refer to transmissions that do not use such CE techniques. In cases where UEs and base stations operate according to MulteFire protocols, CE modes and non-CE modes may be defined according to the MulteFire specifications.

Aspects of the disclosure are initially described in the context of a wireless communication system. Aspects of the disclosure are further illustrated by and described with reference to apparatus diagrams, system diagrams, and flowcharts that relate to coverage enhancement mode switching for wireless communications using shared radio frequency spectrum.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices. Wireless communication system 100 may support coverage enhancement mode switching for wireless communications using shared radio frequency spectrum.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques.

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions. In some cases, it may be cost prohibitive for MTC or IoT devices to use licensed spectrum, and such devices may use shared or unlicensed radio frequency spectrum. In some cases, such devices may use unlicensed wideband operation (e.g., using 10 or 20 MHz bandwidth) for communications. Additionally, devices in such deployments may need substantially higher coverage in order to provide reliable communications, due to the likelihood of relatively poor channel conditions. In some cases, such IoT devices may need a 16 dB coverage enhancement over devices operating according to IEEE 802.11 Wi-Fi standards. Various aspects of the present disclosure provide CE techniques that may be used in such devices.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) or next generation NodeBs (gNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communication system 100 may utilize both licensed and unlicensed radio frequency spectrum bands. For example, wireless communication system 100 may employ LTE License Assisted Access (LTE-LAA), LTE Unlicensed (LTE U), or MulteFire radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A carrier may also be referred to as a CC, a layer, a channel, etc. The term "component carrier" may refer to each of the multiple carriers utilized by a UE 115 in CA operation, and may be distinct from other portions of system bandwidth. For instance, a component carrier may be a relatively narrow-bandwidth carrier susceptible of being utilized independently or in combination with other component carriers. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode.

A carrier used for downlink may be referred to as a downlink CC, and a carrier used for uplink may be referred to as an uplink CC. A UE 115 may be configured with multiple downlink CCs and one or more uplink CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an uplink CC and a downlink CC.

In cases where a UE 115 has relatively poor channel conditions, CE techniques may allow for increased reliability of communications. In some cases, one or more control channel transmissions, reference signal transmissions, or combinations thereof may be modified, such as through increased repetitions of transmissions, to provide CE for such a UE 115. The CE transmissions of these control channel or reference signal transmissions may be separate from corresponding non-CE control channel or reference signal transmissions. Thus, a UE 115 may determine whether it should use a CE mode or a non-CE mode for communicating with a base station 105, and may monitor for the CE or non-CE transmissions in performing initial system acquisition. Based on whether the CE or non-CE mode is selected by a UE 115, in some cases a random access request may be transmitted to the base station 105 using random access resources associated with CE mode or non-CE mode connection requests. The base station 105 may identify that a UE 115 is to connect using CE mode or non-CE mode based on the random access resource used by the UE 115. In some cases, the UE 115 may switch from the non-CE mode to the CE mode, or from the CE mode to the non-CE mode when in idle mode and may receive a page from the base station 105. Such a UE may, responsive to the page, use the CE mode or non-CE mode random access resources for transmission of a random access request that is responsive to the page.

In some cases, a UE 115 may initially establish a connection with a base station using CE or non-CE communications, and it may be determined subsequent to the connection establishment that the communications mode should be switched to a different CE mode (e.g., a CE mode connection should be switched to non-CE mode, or vice-versa). In some cases, a UE 115 may determine that a CE mode switch is to be performed and may initiate the mode switching. In some examples, the UE 115 measure channel quality through radio resource monitoring (RRM), and may determine that mode switching is needed if signal qualities compared to a threshold value indicate that the mode should be switched. In some cases, a UE 115 may be in idle mode and may switch between CE modes, or may perform a cell reselection to a different base station 105. In other cases, a UE 115 may be in connected mode and may declare a radio link failure (RLF) to initiate a mode switch. In some cases, a UE 115 may transmit one or more measurement reports to a base station 105, and the base station 105 may determine that mode switching is to be performed at the UE 115. In some cases, the base station 105 may transmit a radio resource control (RRC) reconfiguration message to the UE 115 to switch modes, or may transmit a handover command to the UE 115 to handover to a neighboring base station 105.

Figure 2:
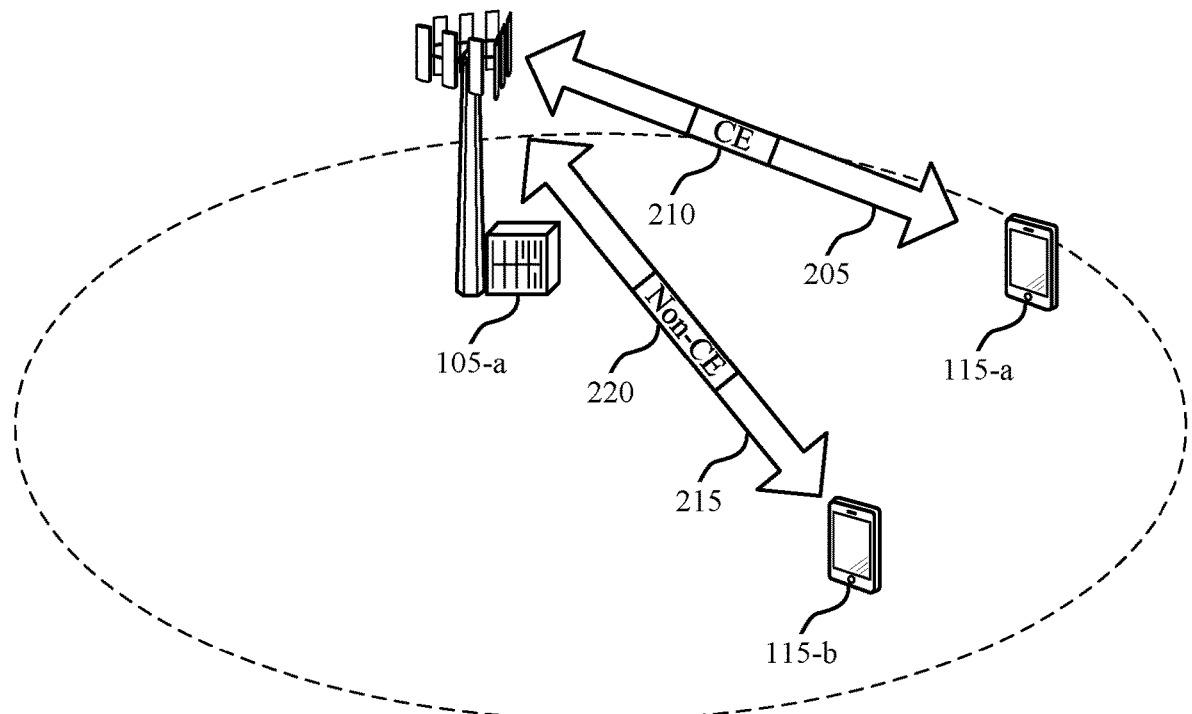
FIG. 2 illustrates an example of a wireless communications system that supports coverage enhancement mode switching for wireless communications using shared radio frequency spectrum in accordance with aspects of the present disclosure.

FIG. 2 illustrates an example of a wireless communication system 200 that supports coverage enhancement mode switching for wireless communications using shared radio frequency spectrum in accordance with aspects of the present disclosure. The wireless communication system 200 may include a base station 105-*a*, a first UE 115-*a* and a second UE 115-*b*, which may be examples of the corresponding devices as described with reference to FIG. 1.

In this example, the first UE 115-*a* may have relatively poor channel conditions and may communicate with base station 105-*a* over wireless connection 205 that may include CE mode transmissions 210. The second UE 115-*b* may have relatively good channel conditions, and may communicate with base station 105-*a* over wireless connection 215 that may include non-CE mode transmissions 220. Various techniques as discussed herein may provide for UE 115-*a* to switch from the CE mode to a non-CE mode, or for UE 115-*b* to switch from the non-CE mode to CE mode.

Figure 3:
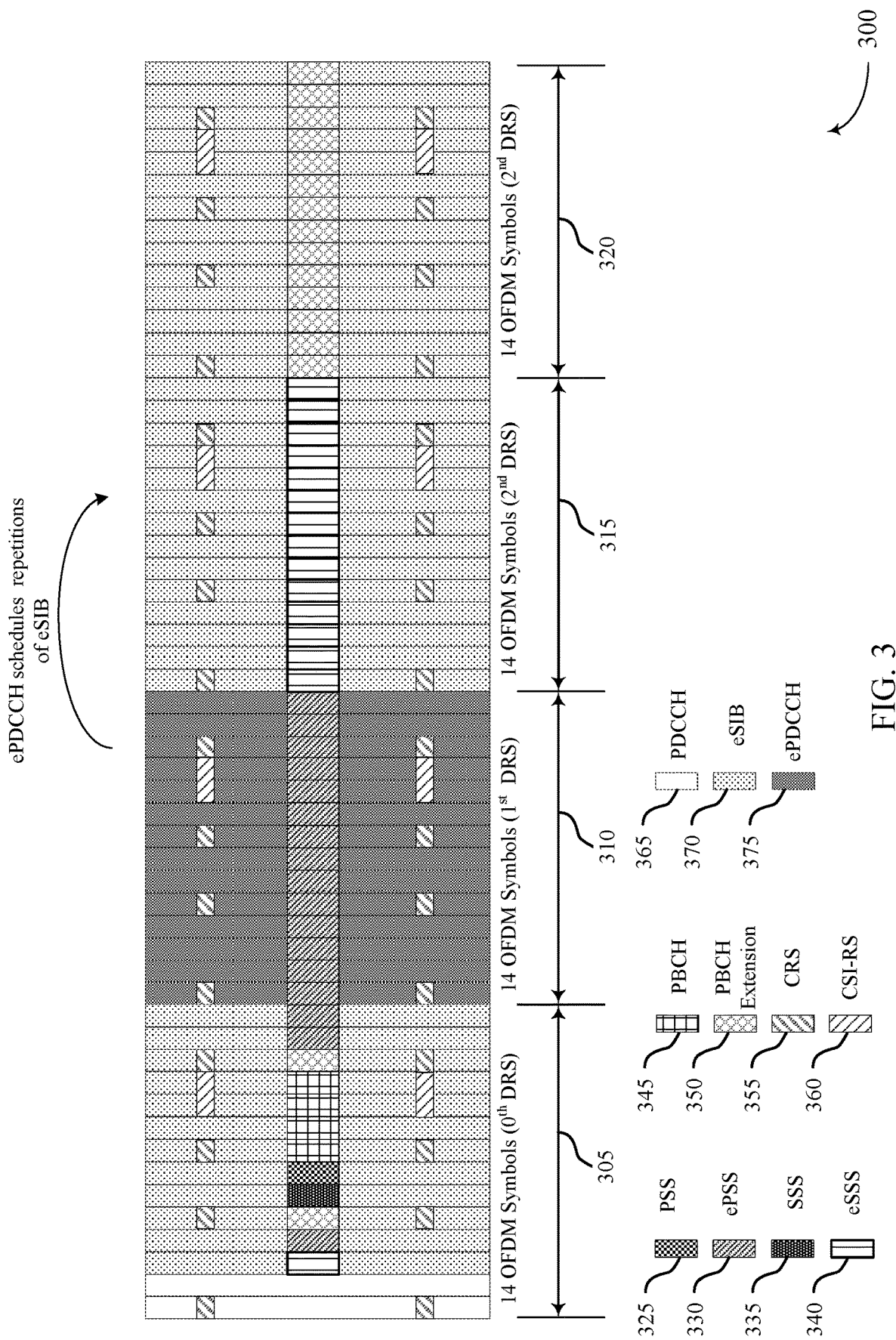
FIG. 3 illustrates an example of wireless resources that support coverage enhancement mode switching for wireless communications using shared radio frequency spectrum in accordance with aspects of the present disclosure.

FIG. 3 illustrates an example of wireless resources 300 that support coverage enhancement mode switching for wireless communications using shared radio frequency spectrum in accordance with aspects of the present disclosure. Wireless resources 300 may be utilized by base stations 105 and UEs 115 as described with reference to FIGS. 1 and 2.

As discussed above, a UE may monitor reference signals or control channel transmissions, or combinations thereof, of a base station and may initiate a connection establishment with the base station based on the monitoring or may determine to switch CE modes of operation based on the monitoring. In some cases, a base station may transmit discovery reference signal (DRS) transmissions for CE mode communications, and may transmit separate DRS transmissions for non-CE mode communications. Such separate transmissions may allow UEs that are deployed and that do not support CE techniques to simply monitor the non-CE mode signals. UEs that are capable of both CE mode and non-CE mode communications may monitor the signals according to the mode in which it is operating. Non-CE mode signals may include DRS transmissions that span one subframe, and may provide low duty cycle synchronization signals and reference signals for radio resource management (RRM) measurement that allow UEs to discover and measure the base station and channel quality associated with the base station. Non-CE DRS can be transmitted within a periodically occurring time window called a DRS measurement timing configuration (DMTC) occasion which may have a duration of 10 ms and a configurable period of 40/80/160 ms. DRS transmissions for CE mode communications may span two or more subframes, be transmitted separately from the non-CE DRS transmissions, and may provide similar information for CE mode UEs. To support multi-subframe DRS, the CE mode DMTC occasion may be longer than 10 ms and may have a longer period such as 80/160/320 ms, or longer.

In the example of FIG. 3, non-CE mode transmissions may include a primary synchronization signal (PSS) 325, a secondary synchronization signal (SSS) 335, a physical broadcast channel (PBCH) 345, a cell-specific reference signal (CRS) 355, channel state information reference signal (CSI-RS) 360, a physical downlink control channel (PDCCH) 365, and system information block (eSIB) 370 transmissions, which may be transmitted using some or all of the indicated portions of resources 300. Non-CE mode transmissions may occur in a first subframe 305, which may include 14 OFDM symbols and a $0^{th}$ DRS.

CE mode transmissions, as indicated above, may include separate signals that may be monitored by a UE operating in CE mode. Such CE mode transmissions may include an enhanced PSS (ePSS) 330, enhanced SSS (eSSS) 340, PBCH extension 350, and enhanced PDCCH (ePDCCH). CE mode transmissions may also use CRS 355, CSI-RS 360 and eSIB 370 signals. In some cases, one or more of these signals may be transmitted with multiple repetitions, and a repetition level may be configurable based on the CE mode. In some cases, ePDCCH 375 may schedule repetitions of eSIB 370 transmissions. In this example, the CE mode transmissions may use resources in a second subframe 310, a third subframe 315, and a fourth subframe 320, in which a $1^{st}$ DRS may be transmitted in subframe 310, and a $2^{nd}$ DRS may span the third subframe 315 and fourth subframe 320.

In some examples, multi-subframe DRS, such as in the example of FIG. 3, may provide resources for unlicensed radio frequency spectrum according to MulteFire protocols, and the first subframe 305 may include legacy MulteFire DRS ($0^{th}$ DRS) extending to 14 symbols. The later subframes 310 through 320 may be used for CE transmissions of ePSS 330, eSSS 340, PBCH extension 350, and eSIB 370. In some examples, ePSS 330 for CE may provide at least 12/14 symbols of ePSS 330 (6RB, 62 carriers). In some examples, eSSS 340 for CE may be extended to 12/14 symbols and 6RB bandwidth and may convey one out of 504 cell IDs (assuming one hypothesis in ePSS 330). The ePBCH extension 350 for CE may provide repetitions of PBCH 345 to support higher coverage, and may support DMTC greater than 10 ms. In some cases, eSIB 370 for CE may include repetition of eSIB 370 in multiple subframes. In some cases, medium access to the shared radio frequency spectrum may be obtained through a category-4 LBT procedure to support the multi-subframe DRS signal, and a priority class may be configured according to repetition number associated with the CE mode.

As indicated above, in some cases a UE may monitor one or more signals from one or more base stations and perform RRM measurements and prepare RRM measurement reports based on the measurements. One or more threshold values may be established for using CE and non-CE modes for transmissions, and the RRM measurements may be compared against the threshold values to determine if a UE should be switched from a non-CE mode to a CE mode, or from a CE mode to a non-CE mode. In some cases, the UE may determine that the switch of modes is to be performed, and may initiate the mode switch. In other cases, the base station may determine that the switch of modes is to be performed, and may initiate the mode switch.

Figure 4:
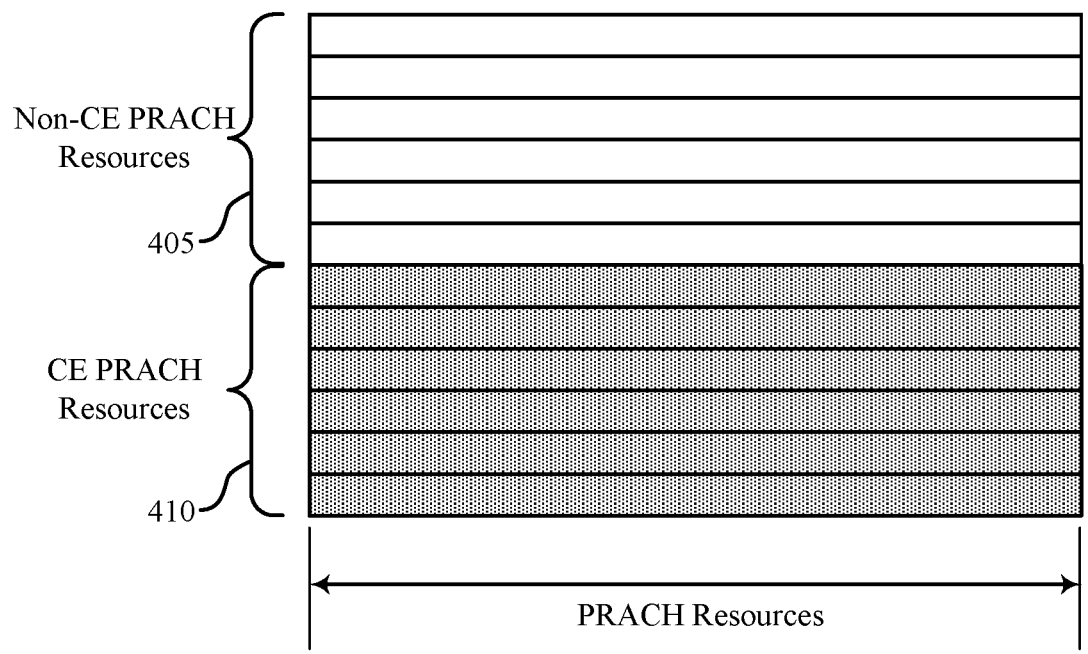
FIG. 4 illustrates an example of random access resources that support coverage enhancement mode switching for wireless communications using shared radio frequency spectrum in accordance with aspects of the present disclosure.

FIG. 4 illustrates an example of random access resources 400 that support coverage enhancement mode switching for wireless communications using shared radio frequency spectrum in accordance with various aspects of the present disclosure. Wireless resources 300 may be utilized by base stations 105 and UEs 115 as described with reference to FIGS. 1 and 2. As discussed above, in some examples a UE may use certain random access resources to initiate a CE mode connection with a base station, and may use other random access resources to initiate a non-CE mode connection with the base station. In some examples, resources of a physical random access channel (PRACH) may be allocated to provide a first set of non-CE PRACH resources 405 and a second set of CE PRACH resources 410. While the example of FIG. 4 shows the first set of non-CE PRACH resources 405 and the second set of CE PRACH resources 410 as contiguous resources, such resources may not be contiguous in frequency or time in other examples. The different PRACH resources for CE mode and non-CE mode may be used to indicate to the base station the communications mode being requested by a UE. In some examples, the eSIB may provide an indication of random access resources for use in transmitting random access requests for non-CE mode communications.

A UE may decide to transmit a random access request according to CE mode or non-CE mode based on channel quality measurements (e.g. reference signal received power (RSRP)) and may indicate the selected mode by using different PRACH resources. In some cases, the UE may be signaled to initiate a new connection with a base station when a current connection of the UE is to be switched between CE modes of operation, and the UE may select the appropriate PRACH resources for a random access request responsive to the received signaling. Depending on the PRACH resources selected by the UE, the base station may identify the non-CE mode or CE mode of operation, and transmit one or more random access response messages (e.g., MSG2, MSG4, etc.) on the corresponding CE mode or non-CE mode downlink control and data channels. In some cases, the UE may switch from the non-CE mode to the CE mode, or from the CE mode to the non-CE mode when in idle mode and may receive a page from the base station. Such a UE may, responsive to the page, use the non-CE PRACH resources 405 or the CE PRACH resources 410 for transmission of a random access request (e.g., MSG1) that is responsive to the page, based on whether the UE has switched to the CE mode or non-CE mode.

In some cases, the base station may use one or more reserved bits in a random access response (e.g., MSG2) message to indicate the mode in which the UE is to connect. In some examples, the base station may have centralized control over the CE and non-CE modes in which UEs operate (e.g., the base station may force all UEs to connect in non-CE mode depending on the current available resources). In such cases, depending on the CE mode bit in the random access response, the UE may determine its mode of operation and receives further random access messages (e.g., MSG4) or following downlink transmissions on the corresponding CE/non-CE downlink control/data channel.

Figure 5:
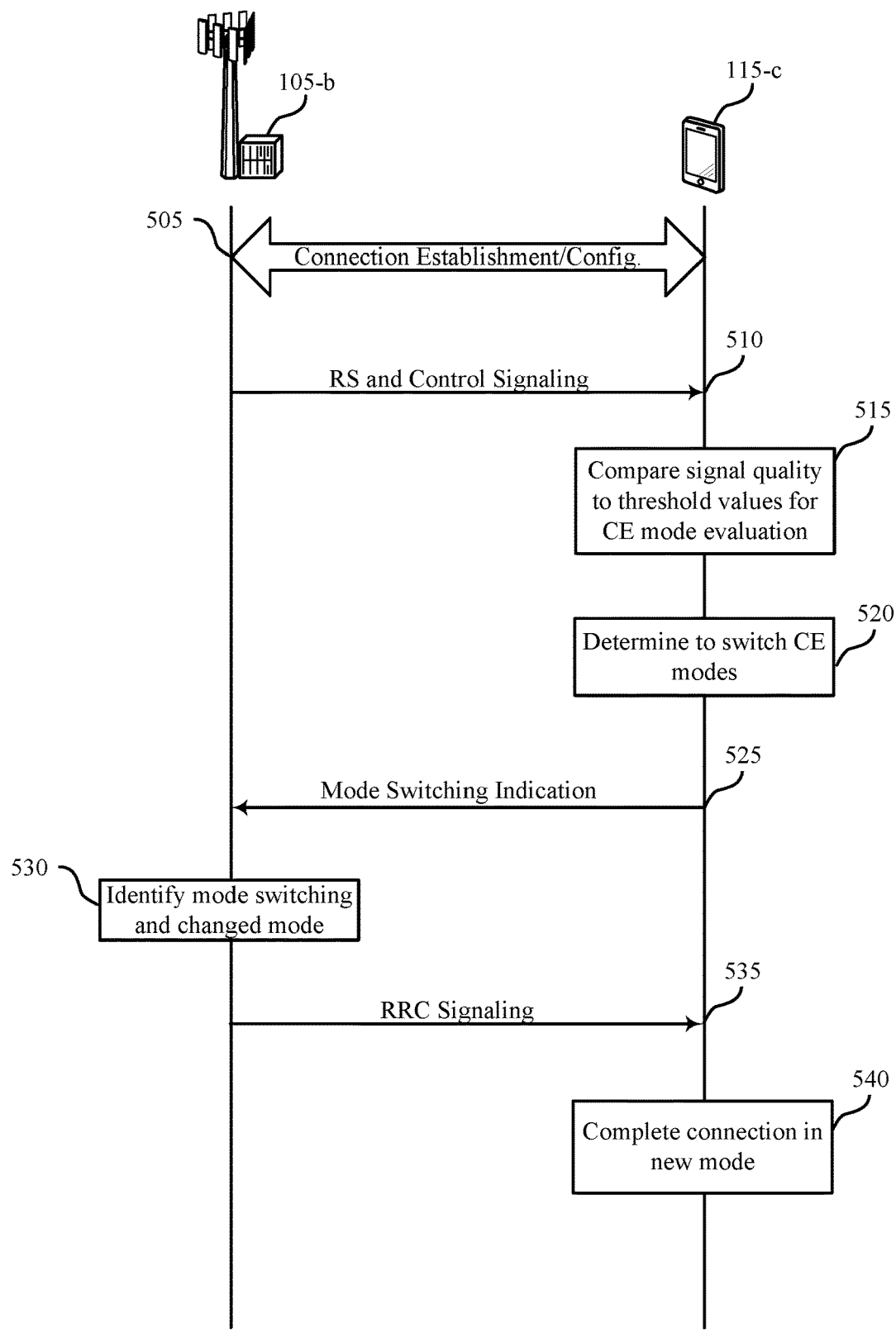
FIG. 5 illustrates an example of a process flow that supports coverage enhancement mode switching for wireless communications using shared radio frequency spectrum in accordance with aspects of the present disclosure.

FIG. 5 illustrates an example of a process flow 500 that supports coverage enhancement mode switching for wireless communications using shared radio frequency spectrum in accordance with various aspects of the present disclosure. Process flow 500 may include a base station 105-*b*, and a UE 115-*c*, which may be examples of the corresponding devices described with reference to FIG. 1-2.

The base station 105-*b* and the UE 115-*c* may establish a connection 505 to initiate communications. In some cases, the connection 505 may be a CE mode connection based on the UE 115-*c* having relatively poor channel conditions. In other cases, the connection 505 may be a non-CE mode connection based on the UE 115-*c* having relatively good channel conditions. After the initial connection, the base station 105-*b* may transmit periodic reference signal and control signals 510 that may be monitored by the UE 115-*c*.

At block 515, the UE 115-*c* may compare signal quality to threshold values for CE mode activation or deactivation. In some cases, the UE may perform RRM measurements, and one or more channel quality threshold values may be established to determine if a connection is to be switched from a CE mode connection to a non-CE mode connection, or vice-versa.

At block 520, the UE 115-*c* may determine to switch CE modes. In some cases, the UE 115-*c* may be in idle mode, and may begin monitoring reference signals and control channel transmissions of the base station 105-*b* using the different mode. In some cases, the base station 105-*b* may transmit information, such as paging information, using both CE mode transmissions and non-CE mode transmissions in order to provide information to the UE 115-*c* regardless of which mode the UE 115-*c* is operating in, and the UE 115-*c* may use non-CE random access resources or CE random access resources for transmission of a random access request that is responsive to the page based on whether the UE 115-*c* is to transmit in the non-CE mode or CE mode. In some cases, the UE 115-*c* may monitor one or more signals from one or more neighboring base stations 115, and may determine that a different base station provides better signal quality than the serving base station 105-*b*. In such cases, the UE 115-*c* may perform cell reselection to establish a connection with the neighboring base station. In some case, non-CE mode communications may have priority over CE mode operations, and if channel quality supports a non-CE mode connection that UE 115-*c* may seek to use such a non-CE mode connection. In some examples, if the non-CE mode coverage signal quality is below some threshold, after a timer has expired, UE 115-*c* may switch to CE mode and monitor the CE mode channels. Similarly, if the non-CE mode coverage signal quality is above a predefined threshold, after a pre-define timer has expired, the UE 115-*c* may switch from CE mode to non-CE mode and monitor the non-CE mode channels.

In cases where a UE 115-*c* may perform cell reselection, based on a cell reselection parameter S, and if CE-mode S<$S_{intrasearch}$ or S<$S_{nonintrasearch}$, the UE 115-*c* may begin to search for neighbor cells. If the signal quality of the neighbor cell in non-CE mode $S_{n,legacy}$, is better than that of serving base station 105-*b* $S_{s,WCE}$, $S_{n,legacy}-\Delta_1>S_{s,WCE}$, after a timer $T_{n,1}$ has expired, the UE 115-*c* may perform reselection to neighbor cell in non-CE mode. Otherwise, if the signal quality of the neighbor cell in CE mode $S_{n,WCE}$ is better than that of serving base station 105-*b* $S_{s,WCE}$, $S_{n,WCE}-\Delta_2>S_{s,WCE}$, after a timer $T_{n,2}$ has expired, the UE 115-*c* may perform reselection to neighbor cell in CE mode.

In some cases, the UE 115-*c* and base station 105-*b* may be in connected mode, and the signal quality at the UE 115-*c* may drop substantially necessitating a switch from a non-CE mode to a CE mode. For example, a data link may suddenly be blocked by a piece of equipment that has high penetration losses. In such cases, relatively fast switching may be desirable in order to maintain communications. Likewise, operations in CE mode to non-CE mode may be desirable if link conditions improve, as CE mode operations consume more system resources and non-CE mode operations may help conserve resources. In some cases, the UE 115-c may initiate switching of modes. In some cases, the UE 115-c may declare a radio link failure (RLF) to initiate mode switching. In some cases, a UE 115-c may operate in non-CE mode and link quality may degrade to the point that the radio link is not sustainable and the UE 115-c may wait until RLF and transmit a random access request to the base station 105-b using random access resources for CE mode connection. In other examples, UE 115-c may declare RLF early, prior to a RLF timer expiring. In such cases, UE 115-c may measure the serving base station 105-b link quality and decide if it needs to switch from non-CE mode to CE mode. The UE 115-c may transmit mode switching indication 525 to the base station 105-b to indicate that the base station 105-b is to initialize RRC reconfiguration and may set a reconfiguration timer. If the timer expires before the base station 105-b transmits a RRC reconfiguration, the UE 115-b may transmit a random access request using CE PRACH resources. In some cases, the mode switching indication 525 may be transmitted in an uplink transmission. In other cases, the mode switching indication 525 may be transmitted as a random access request using PRACH resources as discussed above with respect to FIG. 4.

At block 530, the base station 105-b may identify the mode switching requested a the UE 115-c. The base station 105-b may transmit RRC signaling 535 to the UE 115-c to reestablish the connection in the different CE mode. In some cases, the RRC signaling 535 may be an RRC reconfiguration message. In other cases, the RRC signaling may be transmitted responsive to a random access request from the UE 115-c. At block 540, the UE 115-c may complete the connection in the new mode.

Figure 6:
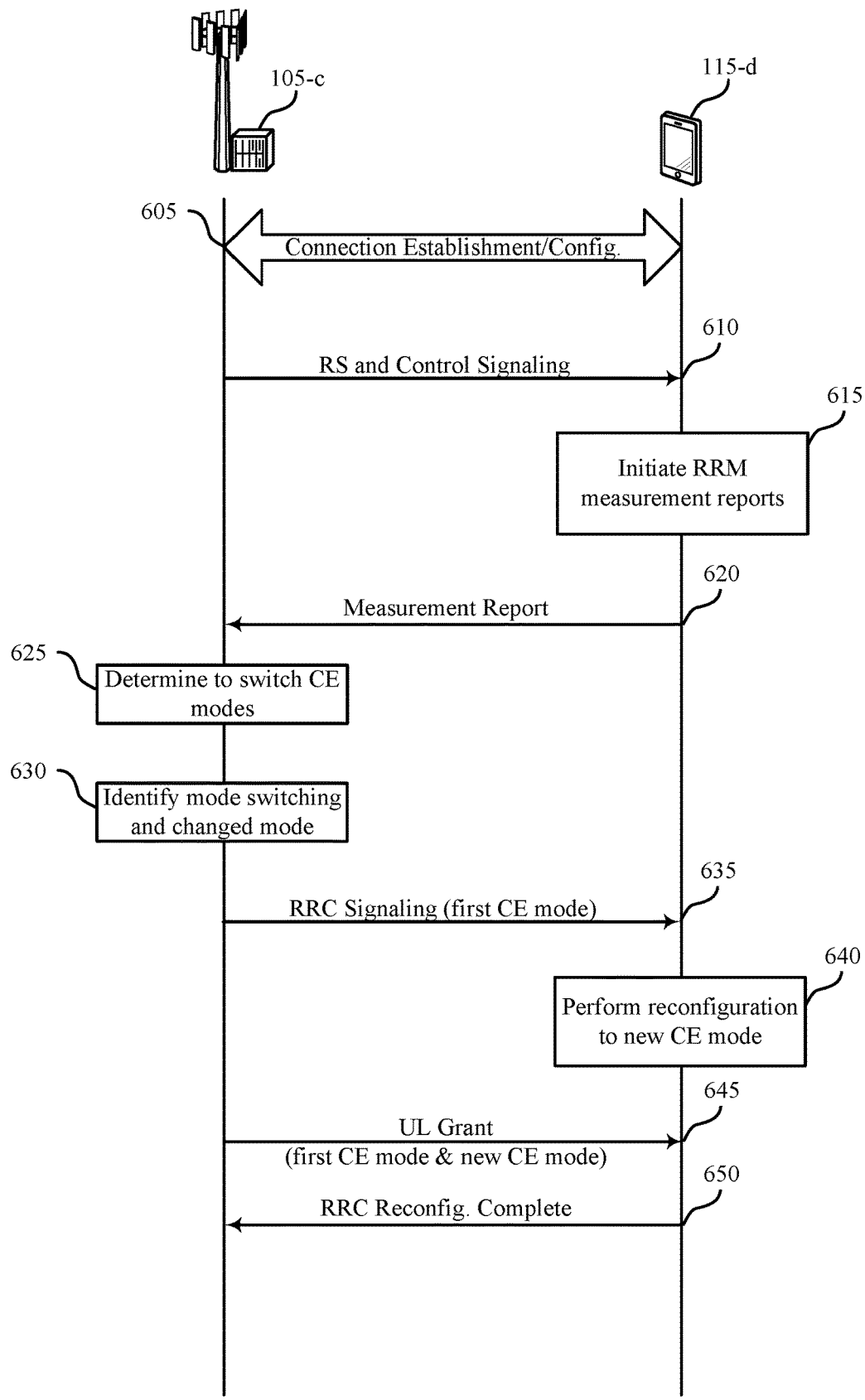
FIG. 6 illustrates an example of a process flow that supports coverage enhancement mode switching for wireless communications using shared radio frequency spectrum in accordance with aspects of the present disclosure.

FIG. 6 illustrates an example of a process flow 600 that supports coverage enhancement mode switching for wireless communications using shared radio frequency spectrum in accordance with various aspects of the present disclosure. Process flow 600 may include a base station 105-c, and a UE 115-d, which may be examples of the corresponding devices described with reference to FIG. 1-2.

The base station 105-c and the UE 115-d may establish a connection 605 to initiate communications. In some cases, the connection 605 may be a CE mode connection based on the UE 115-d having relatively poor channel conditions. In other cases, the connection 605 may be a non-CE mode connection based on the UE 115-d having relatively good channel conditions. After the initial connection, the base station 105-c may transmit periodic reference signal and control signals 610 that may be monitored by the UE 115-d.

At block 615, the UE 115-d may initiate RRM measurement reports, which may be based on a configuration provided by the base station 105-c. The RRM measurement report may include RRM measurements for CE mode reference signal transmissions and non-CE mode reference signal transmissions, in some examples. The UE 115-d may transmit a measurement report 620 to the base station 105-c, which may in some cases initiate a switch of modes at the UE 115-d.

At block 625, the base station 105-c may determine that the UE 115-d is to switch modes from a CE mode to a non-CE mode, or from non-CE mode to CE mode. At block 630, the base station 105-c may determine the mode that the UE 115-d is to be switched to. In some cases, the base station 105-c may make such a decision based on the RRM measurement reports. In some cases, the base station 105-c may configure two kinds of measurement for CE and non-CE mode reports. In some cases, the base station 105-c may trigger reports, or may configure periodic reporting at the UE 115-d. The configuration may be, for example, that a CE or non-CE measurement report is to be performed based on a CE/non-CE DMTC configuration. In some cases, the base station 105-c may set two thresholds for non-CE measurements. A first threshold may provide that if a non-CE measurement is below $TH_{WCE}$, the UE 115-c should be switched to CE mode. A second threshold may provide that is a CE measurement is above $TH_{nonWCE}$ the UE 115-d should be switched to the non-CE mode.

In some cases, UE 115-d may be RRC reconfigured to monitor ePDCCH/PDCCH and the base station 105-c may send an RRC reconfiguration message 635 to indicate that the UE 115-d is to connect in a first CE mode (e.g., CE mode or non-CE mode). The UE 115-d may, after the base station 105-c sends the RRC reconfiguration message (using the initial control channels of the initial connected mode), and the UE 115-d may at block 640 perform a reconfiguration into the new CE mode. The base station 105-c may transmit an uplink grant 645 to allocate resources to the UE 115-d using the new mode. The uplink grant may be transmitted using control channels for both the initial CE mode and the new CE mode, in order to make sure that the UE 115-d receives the uplink grant. The UE 115-d, upon completion of the RRC reconfiguration, may transmit a RRC reconfiguration complete message 650 to the base station 105-c. Once the base station 105-c receives the RRC reconfiguration complete message 650, subsequent control information transmitted to the UE 115-d may be transmitted using the new CE mode only.

In some cases, rather than an RRC reconfiguration message, the base station 105-c may transmit a handover-like message that indicates the UE 115-d is to reattach in a different CE mode. In such cases, the base station 105-c may transmit a handover-like RRC reconfiguration command to UE 115-d which includes the RRC configurations for the new channel. The UE 115-d may switch to the new mode and, when it is ready to monitor the new channel, may transmit a random access request with a dedicated preamble into a PRACH opportunity of the corresponding mode. The base station 105-c may, responsive to the random access request, transmit a random access response (e.g., a MSG2) using the control channel using the new CE mode, and the UE 115-d may complete a contention-free or contention-based RACH procedure.

Figure 7:
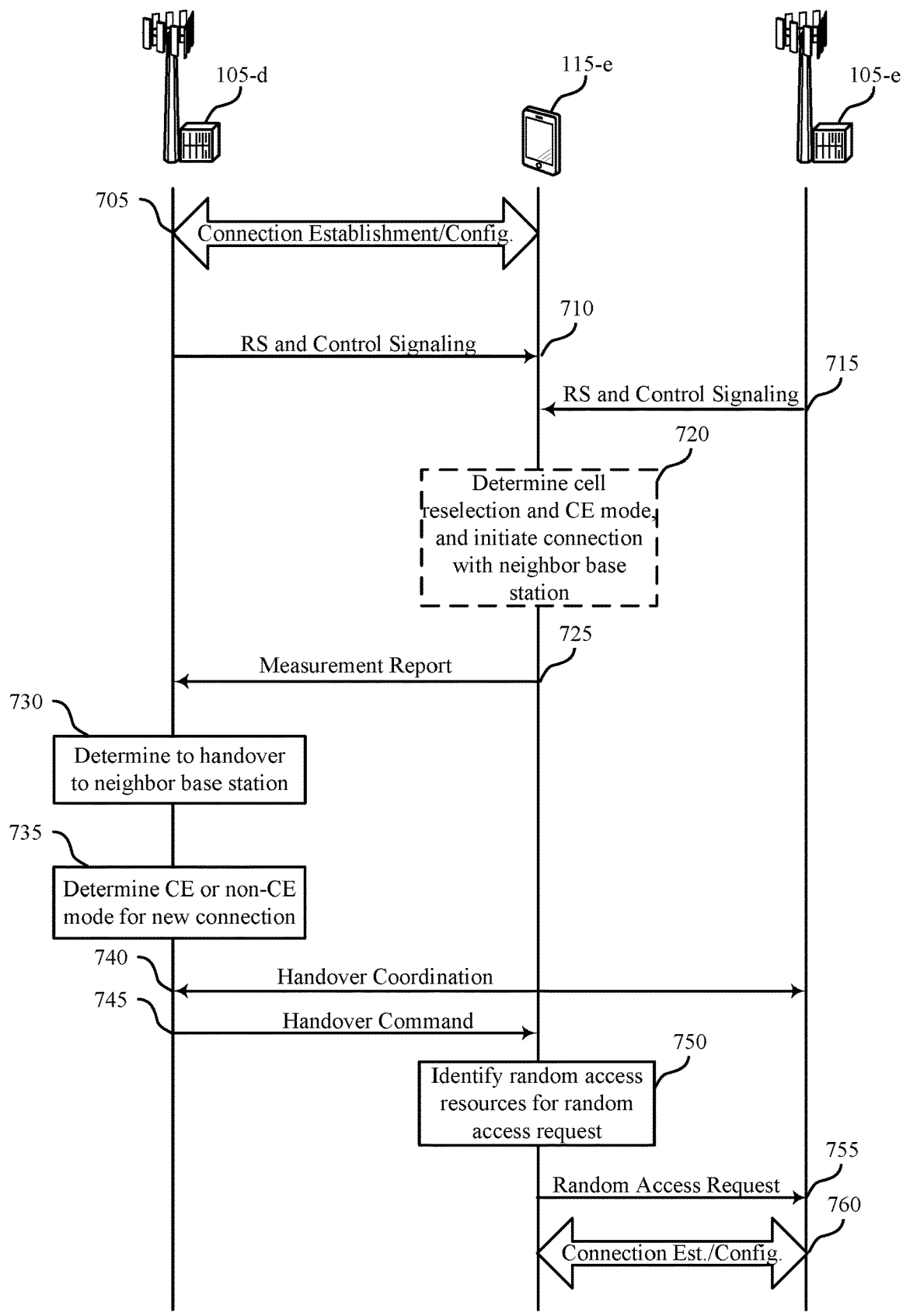
FIG. 7 illustrates an example of a process flow that supports coverage enhancement mode switching for wireless communications using shared radio frequency spectrum in accordance with aspects of the present disclosure.

FIG. 7 illustrates an example of a process flow 700 that supports coverage enhancement mode switching for wireless communications using shared radio frequency spectrum in accordance with various aspects of the present disclosure. Process flow 700 may include a source base station 105-d, a target base station 105-e, and a UE 115-e, which may be examples of the corresponding devices described with reference to FIG. 1-2.

The source base station 105-d and the UE 115-e may establish a connection 705 to initiate communications. In some cases, the connection 705 may be a CE mode connection based on the UE 115-e having relatively poor channel conditions. In other cases, the connection 705 may be a non-CE mode connection based on the UE 115-e having relatively good channel conditions. After the initial connection, the source base station 105-d may transmit periodic reference signal and control signals 710 that may be monitored by the UE 115-e. The target base station 105-e may also transmit periodic reference signal and control signals 715 that may be monitored by the UE 115-e.

At optional block 720, the UE 115-e may determine cell reselection and CE mode for a new cell, and initiate a connection with target or neighbor base station 105-e. In some cases, the UE 115-e may initiate cell reselection when the UE 115-e is in idle mode.

The UE 115-e may monitor the periodic reference signals, and may perform RRM measurements with CE and non-CE configurations for the source base station 105-d and the target base station 105-e. The UE 115-e may transmit measurement report 725 to the source base station 105-d. Based on the CE/non-WCE measurement the source base station 105-d, at block 730, may determine that the target base station 105-e is to receive a handover of the UE 115-e. At block 735, the source base station 105-d may determine whether the new connection is to be a CE or non-CE mode connection. The source base station 105-d may coordinate handover 740 with the target base station 105-e, and may transmit handover command 745 to UE 115-e. The handover command 745 may include the CE mode that the UE 115-e is to use at the target base station 105-e.

After handover command, the UE 115-e, at block 750, may identify random access resources for the connection with the target base station, and may transmit random access request 755 to the target base station 105-e using the non-CE or CE PRACH resources of the corresponding mode. The UE 115-e and target base station 105-e may establish connection 760. The target base station 105-e may use the downlink control and data channel transmissions corresponding to the non-CE/CE mode.

Figure 8:
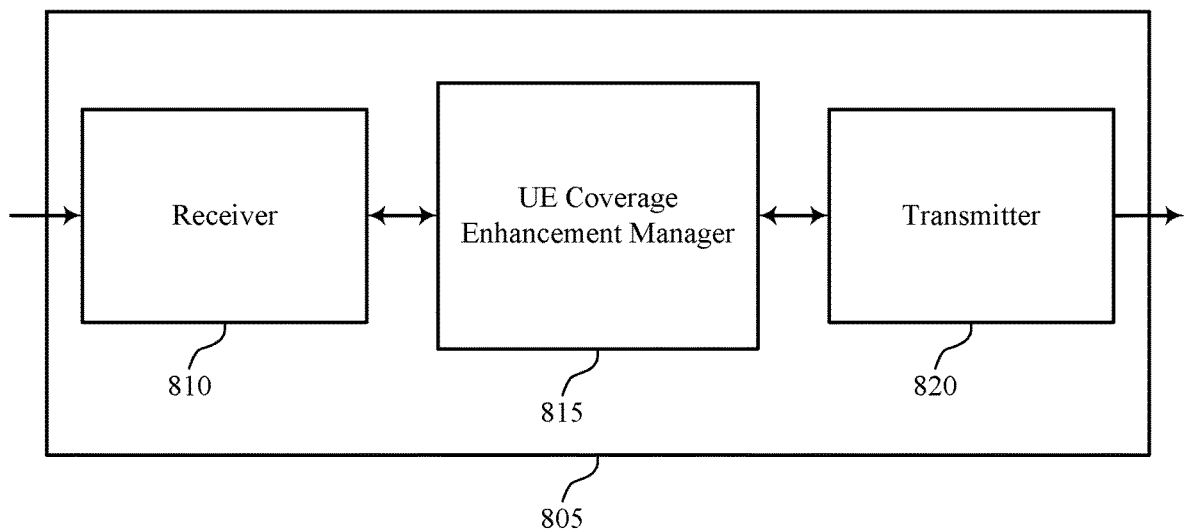
FIGS. 8 through 10 show block diagrams of a device that supports coverage enhancement mode switching for wireless communications using shared radio frequency spectrum in accordance with aspects of the present disclosure.

FIG. 8 shows a block diagram 800 of a wireless device 805 that supports coverage enhancement mode switching for wireless communications using shared radio frequency spectrum in accordance with aspects of the present disclosure. Wireless device 805 may be an example of aspects of a user equipment (UE) 115 as described with reference to FIG. 1. Wireless device 805 may include receiver 810, UE coverage enhancement manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to coverage enhancement mode switching for wireless communications using shared radio frequency spectrum, etc.). Information may be passed on to other components of the device. The receiver 810 may be an example of aspects of the transceiver 1135 described with reference to FIG. 11. The receiver 810 may utilize a single antenna or a set of antennas.

UE coverage enhancement manager 815 may be an example of aspects of the UE coverage enhancement manager 1115 described with reference to FIG. 11.

UE coverage enhancement manager 815 and/or at least some of its various sub-components may be implemented in hardware, software executed by a processor, firmware, or any combination thereof. If implemented in software executed by a processor, the functions of the UE coverage enhancement manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE coverage enhancement manager 815 and/or at least some of its various sub-components may be physically located at various positions, including being distributed such that portions of functions are implemented at different physical locations by one or more physical devices. In some examples, UE coverage enhancement manager 815 and/or at least some of its various sub-components may be a separate and distinct component in accordance with various aspects of the present disclosure. In other examples, UE coverage enhancement manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE coverage enhancement manager 815 may establish a connection with a base station according to a non-coverage enhancement (non-CE) mode, monitor a channel quality of a radio link with the base station, and switch from the non-CE mode to a CE mode based on the channel quality of the radio link being below a threshold value for a first time period. The UE coverage enhancement manager 815 may also establish a connection with a base station according to a non-coverage enhancement (non-CE) mode, provide the base station with an indication of a channel quality of a radio link with the base station, and receive an indication from the base station to reestablish the connection using a coverage enhancement (CE) mode based on the indication of the channel quality of the radio link. The UE coverage enhancement manager 815 may also establish a first connection with a first base station according to a coverage enhancement (CE) mode or a non-CE mode, provide the first base station with an indication of a channel quality of a radio link with the first base station and one or more channel quality measurements for one or more neighboring base stations, the one or more neighboring base stations including a second base station, and receive a handover command from the base station to establish a second connection with the second base station, the handover command indicating a CE mode or non-CE mode for the second connection.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
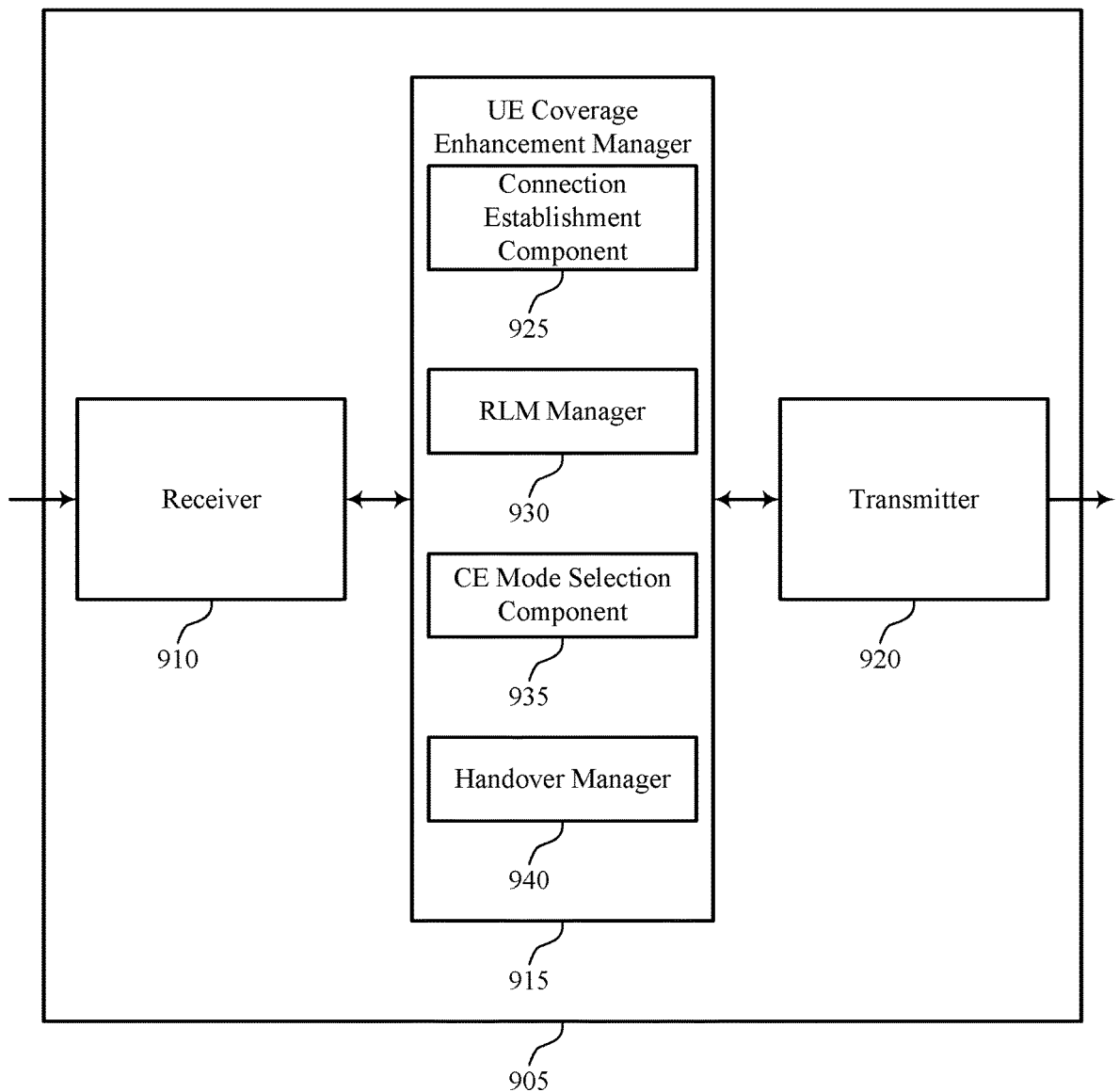

FIG. 9 shows a block diagram 900 of a wireless device 905 that supports coverage enhancement mode switching for wireless communications using shared radio frequency spectrum in accordance with aspects of the present disclosure. Wireless device 905 may be an example of aspects of a wireless device 805 or a UE 115 as described with reference to FIGS. 1 and 8. Wireless device 905 may include receiver 910, UE coverage enhancement manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to coverage enhancement mode switching for wireless communications using shared radio frequency spectrum, etc.). Information may be passed on to other components of the device. The receiver 910 may be an example of aspects of the transceiver 1135 described with reference to FIG. 11. The receiver 910 may utilize a single antenna or a set of antennas.

UE coverage enhancement manager 915 may be an example of aspects of the UE coverage enhancement manager 1115 described with reference to FIG. 11. UE coverage enhancement manager 915 may also include connection establishment component 925, RLM manager 930, CE mode selection component 935, and handover manager 940.

Connection establishment component 925 may establish a connection with a base station according to a non-coverage enhancement (non-CE) mode or a CE mode. In some cases, an uplink grant to transmit an uplink transmission using the CE mode or non-CE mode may be transmitted using both non-CE and CE control resources. Connection establishment component 925 may also transmit a radio resource control (RRC) reconfiguration complete message to the base station.

RLM manager 930 may monitor a channel quality of a radio link with the base station, and may determine that the channel quality of the radio link is above the threshold value for a time period or below the threshold for a time period. The RLM manager may also provide the base station with an indication of a channel quality of a radio link with the base station, and one or more channel quality measurements for one or more neighboring base stations. In some cases, the monitoring the channel quality includes monitoring a first reference signal associated with non-CE mode transmissions, and the determining that the channel quality of the radio link is above the threshold value includes monitoring a second reference signal associated with CE mode transmissions. In some cases, the providing the base station with the indication of the channel quality includes providing a measurement report to the base station that includes measurements associated with one or more of non-CE mode transmissions or CE mode transmissions of the base station. In some cases, the measurement report is provided to the base station periodically or based on a trigger received from the base station. In some cases, the measurement report includes both CE mode measurements based on a first measurement window associated with CE mode transmissions and non-CE mode measurements based on a second measurement window associated with non-CE mode transmissions. In some cases, the non-CE mode measurements have an associated first threshold value for switching from the non-CE mode to the CE mode, and the CE mode measurements have an associated second threshold value for switching from the CE mode to the non-CE mode.

CE mode selection component 935 may switch from the non-CE mode to a CE mode based on the channel quality of the radio link being below a threshold value for a first time period, or switch from the CE mode to the non-CE mode responsive to the determining that the channel quality of the radio link is above the threshold value for a second time period. In some cases, the CE mode selection component 935 may receive an indication from the base station to reestablish the connection using a coverage enhancement (CE) mode based on an indication of the channel quality of the radio link. In some cases, the non-CE mode is preferred over the CE mode, and the second time period is selected to be shorter than the first time period.

Handover manager 940 may determine, subsequent to the switching, that the channel quality of the radio link is below a cell reselection threshold, measure a signal quality of one or more neighboring base stations, determine to perform a reselection procedure to establish a non-CE mode connection with a first neighboring base station based on the first signal quality exceeding the channel quality of the radio link by a first offset value. In some cases, handover manager 940 may determine to perform a reselection procedure to establish a CE mode connection with the first neighboring base station based on the second signal quality exceeding the channel quality of the radio link by a second offset value. In some cases, handover manager 940 may receive a handover command from the base station to establish a second connection with the second base station, the handover command indicating a CE mode or non-CE mode for the second connection. In some cases, the measuring the signal quality includes measuring a first signal quality of one or more non-CE mode reference signals of the neighboring base stations, and measuring a second signal quality of one or more CE mode reference signals of the neighboring base stations. In some cases, the second offset value is less than the first offset value.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
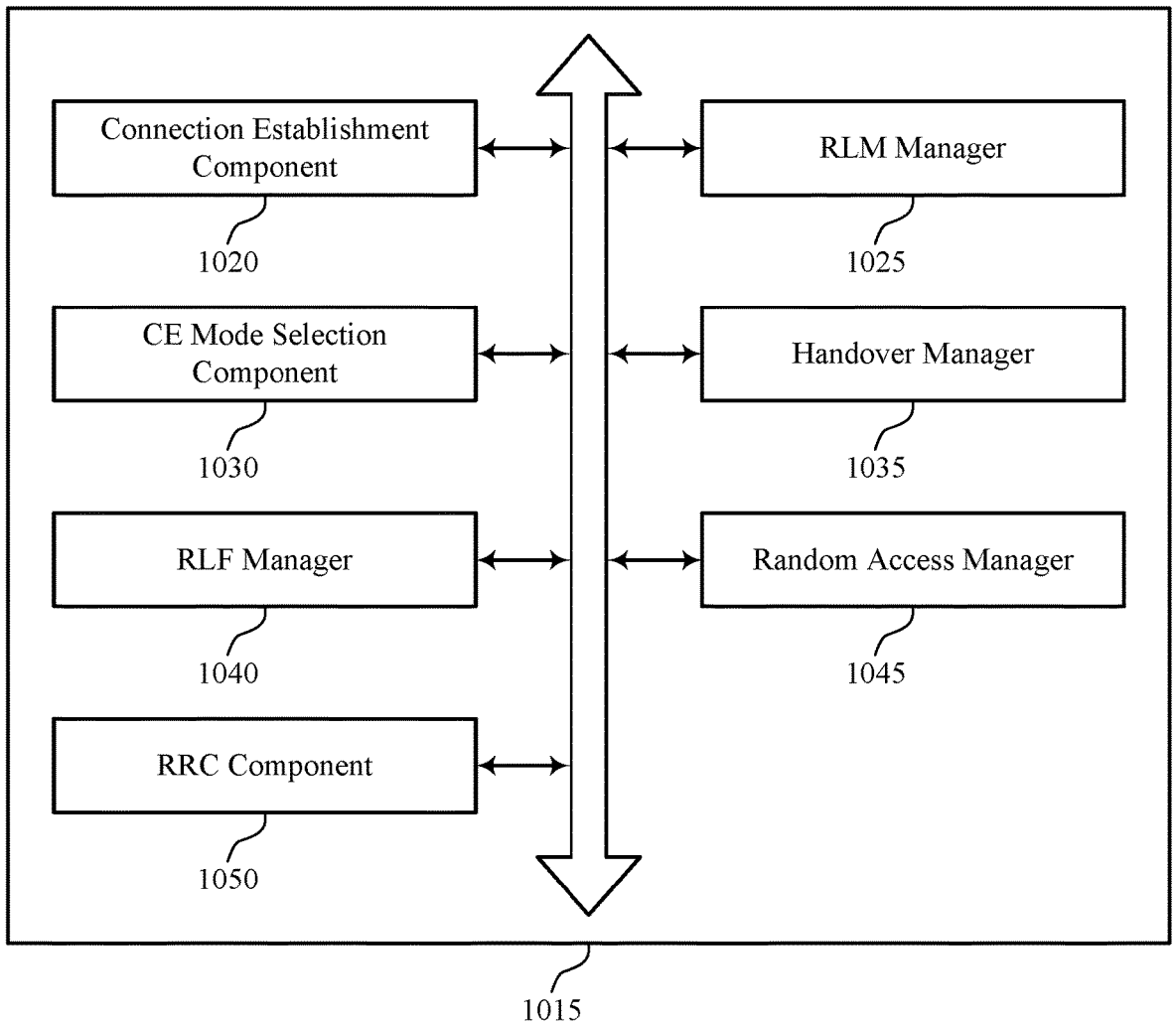

FIG. 10 shows a block diagram 1000 of a UE coverage enhancement manager 1015 that supports coverage enhancement mode switching for wireless communications using shared radio frequency spectrum in accordance with aspects of the present disclosure. The UE coverage enhancement manager 1015 may be an example of aspects of a UE coverage enhancement manager 815, a UE coverage enhancement manager 915, or a UE coverage enhancement manager 1115 described with reference to FIGS. 8, 9, and 11. The UE coverage enhancement manager 1015 may include connection establishment component 1020, RLM manager 1025, CE mode selection component 1030, handover manager 1035, RLF manager 1040, random access manager 1045, and RRC component 1050. Each of these modules may communicate, directly or indirectly, with one another (e.g., via one or more buses).

Connection establishment component 1020 may establish a connection with a base station according to a non-coverage enhancement (non-CE) mode, receive an uplink grant to transmit an uplink transmission using the CE mode that is transmitted using both non-CE and CE control resources, transmit a RRC reconfiguration complete message to the base station, and establish a first connection with a first base station according to a coverage enhancement (CE) mode or a non-CE mode.

RLM manager 1025 may monitor a channel quality of a radio link with the base station, and may determine that the channel quality of the radio link is above the threshold value for a time period or below the threshold for a time period. The RLM manager may also provide the base station with an indication of a channel quality of a radio link with the base station, and one or more channel quality measurements for one or more neighboring base stations. In some cases, the monitoring the channel quality includes monitoring a first reference signal associated with non-CE mode transmissions, and the determining that the channel quality of the radio link is above the threshold value includes monitoring a second reference signal associated with CE mode transmissions. In some cases, the providing the base station with the indication of the channel quality includes providing a measurement report to the base station that includes measurements associated with one or more of non-CE mode transmissions or CE mode transmissions of the base station. In some cases, the measurement report is provided to the base station periodically or based on a trigger received from the base station. In some cases, the measurement report includes both CE mode measurements based on a first measurement window associated with CE mode transmissions and non-CE mode measurements based on a second measurement window associated with non-CE mode transmissions. In some cases, the non-CE mode measurements have an associated first threshold value for switching from the non-CE mode to the CE mode, and the CE mode measurements have an associated second threshold value for switching from the CE mode to the non-CE mode.

CE mode selection component 1030 may switch from the non-CE mode to a CE mode based on the channel quality of the radio link being below a threshold value for a first time period, or switch, responsive to the determining that the channel quality of the radio link is above the threshold value for a second time period, from the CE mode to the non-CE mode. In some cases, the CE mode selection component 1030 may receive an indication from the base station to reestablish the connection using a coverage enhancement (CE) mode based on an indication of the channel quality of the radio link. In some cases, the non-CE mode is preferred over the CE mode, and where the second time period is selected to be shorter than the first time period.

Handover manager 1035 may determine, subsequent to the switching, that the channel quality of the radio link is below a cell reselection threshold, measure a signal quality of one or more neighboring base stations, determine to perform a reselection procedure to establish a non-CE mode connection with a first neighboring base station based on the first signal quality exceeding the channel quality of the radio link by a first offset value. In some cases, handover manager 940 may determine to perform a reselection procedure to establish a CE mode connection with the first neighboring base station based on the second signal quality exceeding the channel quality of the radio link by a second offset value. In some cases, handover manager 940 may receive a handover command from the base station to establish a second connection with the second base station, the handover command indicating a CE mode or non-CE mode for the second connection. In some cases, the measuring the signal quality includes measuring a first signal quality of one or more non-CE mode reference signals of the neighboring base stations, and measuring a second signal quality of one or more CE mode reference signals of the neighboring base stations. In some cases, the second offset value is less than the first offset value.

RLF manager 1040 may perform RLF functions at the UE, and in some cases may initiate, subsequent to the transmitting the RLF indication, a reconfiguration timer. In some cases, the switching includes determining a radio link failure (RLF) has occurred, and transmitting a random access request using random access resources associated with the CE mode to establish the CE mode connection. In some cases, the switching includes transmitting a radio link failure (RLF) indication to the base station, and receiving a reconfiguration message from the base station to switch from the non-CE mode to the CE mode. In some cases, the RLF indication is transmitted in an uplink feedback transmission associated with a downlink transmission from the base station. In some cases, the RLF indication is transmitted in a random access transmission using random access resources associated with the CE mode.

Random access manager 1045 may transmit, responsive to an expiration of the reconfiguration timer, a random access request using random access resources associated with the CE mode to establish the CE mode connection. In some cases, random access manager 1045 may transmit a random access request to a second base station based on the handover command using random access resources selected, based on the indication of CE mode or non-CE mode for the second connection, from CE mode random access resources or non-CE mode random access resources. Random access manager 1045 may also receive a random access response and uplink resource grant on a control channel associated with the respective CE mode transmissions or non-CE mode transmissions.

RRC component 1050 may receive a RRC reconfiguration message to reconfigure the connection using the CE mode, and transmit a RRC reconfiguration complete message to the base station upon completion of the RRC reconfiguration. RRC component 1050 may also receive a RRC reconfiguration message to establish a new connection with the base station using the CE mode, and initiate the new connection using the CE mode responsive to the RRC reconfiguration message.

Figure 11:
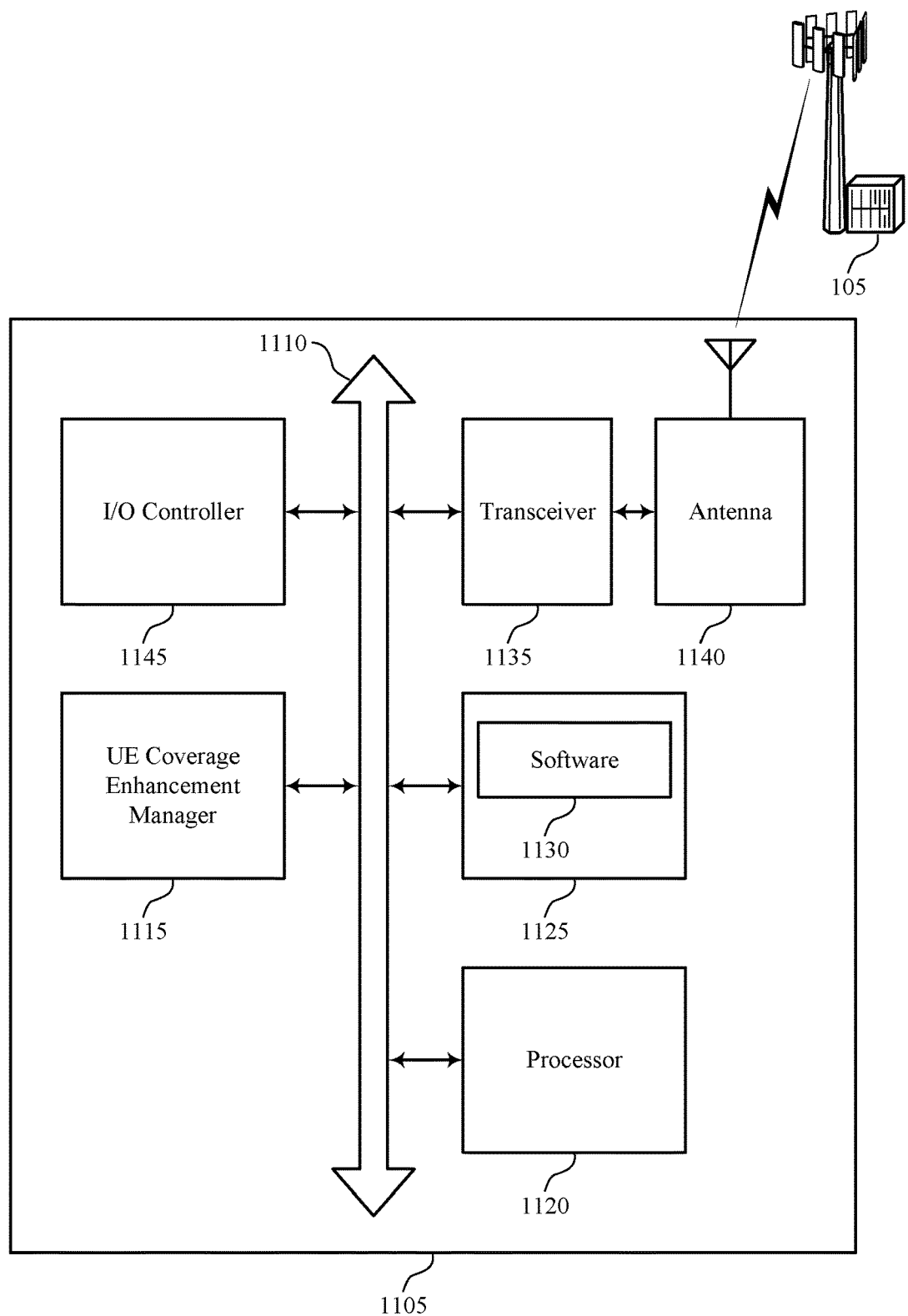
FIG. 11 illustrates a block diagram of a system including a UE that supports coverage enhancement mode switching for wireless communications using shared radio frequency spectrum in accordance with aspects of the present disclosure.

FIG. 11 shows a diagram of a system 1100 including a device 1105 that supports coverage enhancement mode switching for wireless communications using shared radio frequency spectrum in accordance with aspects of the present disclosure. Device 1105 may be an example of or include the components of wireless device 805, wireless device 905, or a UE 115 as described above, e.g., with reference to FIGS. 1, 8 and 9. Device 1105 may include components for bi-directional voice and data communications including components for transmitting and receiving communications, including UE coverage enhancement manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting coverage enhancement mode switching for wireless communications using shared radio frequency spectrum).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support coverage enhancement mode switching for wireless communications using shared radio frequency spectrum. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
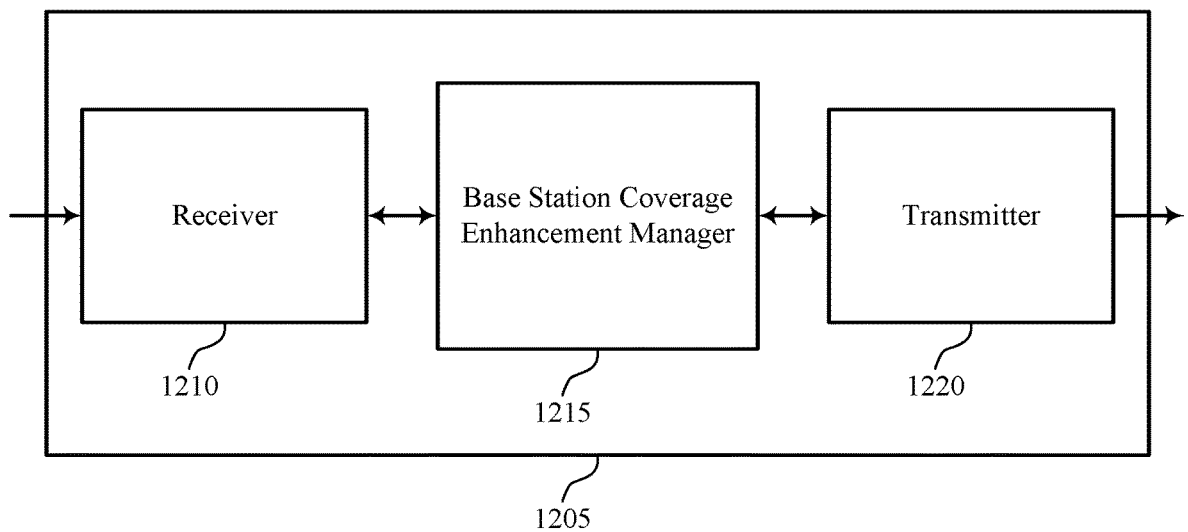
FIGS. 12 through 14 show block diagrams of a device that supports coverage enhancement mode switching for wireless communications using shared radio frequency spectrum in accordance with aspects of the present disclosure.

FIG. 12 shows a block diagram 1200 of a wireless device 1205 that supports coverage enhancement mode switching for wireless communications using shared radio frequency spectrum in accordance with aspects of the present disclosure. Wireless device 1205 may be an example of aspects of a base station 105 as described with reference to FIG. 1. Wireless device 1205 may include receiver 1210, base station coverage enhancement manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to coverage enhancement mode switching for wireless communications using shared radio frequency spectrum, etc.). Information may be passed on to other components of the device. The receiver 1210 may be an example of aspects of the transceiver 1535 described with reference to FIG. 15. The receiver 1210 may utilize a single antenna or a set of antennas.

Base station coverage enhancement manager 1215 may be an example of aspects of the base station coverage enhancement manager 1515 described with reference to FIG. 15.

Base station coverage enhancement manager 1215 and/or at least some of its various sub-components may be implemented in hardware, software executed by a processor, firmware, or any combination thereof. If implemented in software executed by a processor, the functions of the base station coverage enhancement manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station coverage enhancement manager 1215 and/or at least some of its various sub-components may be physically located at various positions, including being distributed such that portions of functions are implemented at different physical locations by one or more physical devices. In some examples, base station coverage enhancement manager 1215 and/or at least some of its various sub-components may be a separate and distinct component in accordance with various aspects of the present disclosure. In other examples, base station coverage enhancement manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station coverage enhancement manager 1215 may establish, at a base station, a connection with a UE according to a non-coverage enhancement (non-CE) mode, receive, from the UE, an indication of a channel quality of a radio link between the UE and the base station, determine that the channel quality of the radio link is below a threshold value, and transmit an indication to the UE to reestablish the connection using a coverage enhancement (CE) mode based on the determining. The base station coverage enhancement manager 1215 may also establish, at a first base station, a first connection with a UE according to a coverage enhancement (CE) mode or a non-CE mode, receive, from the UE, an indication of a channel quality of a radio link with the first base station and one or more channel quality measurements for one or more neighboring base stations, the one or more neighboring base stations including a second base station, determine that the channel quality of the radio link is below a threshold value, and transmit a handover command to the UE to establish a second connection with the second base station, the handover command indicating a CE mode or non-CE mode for the second connection.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
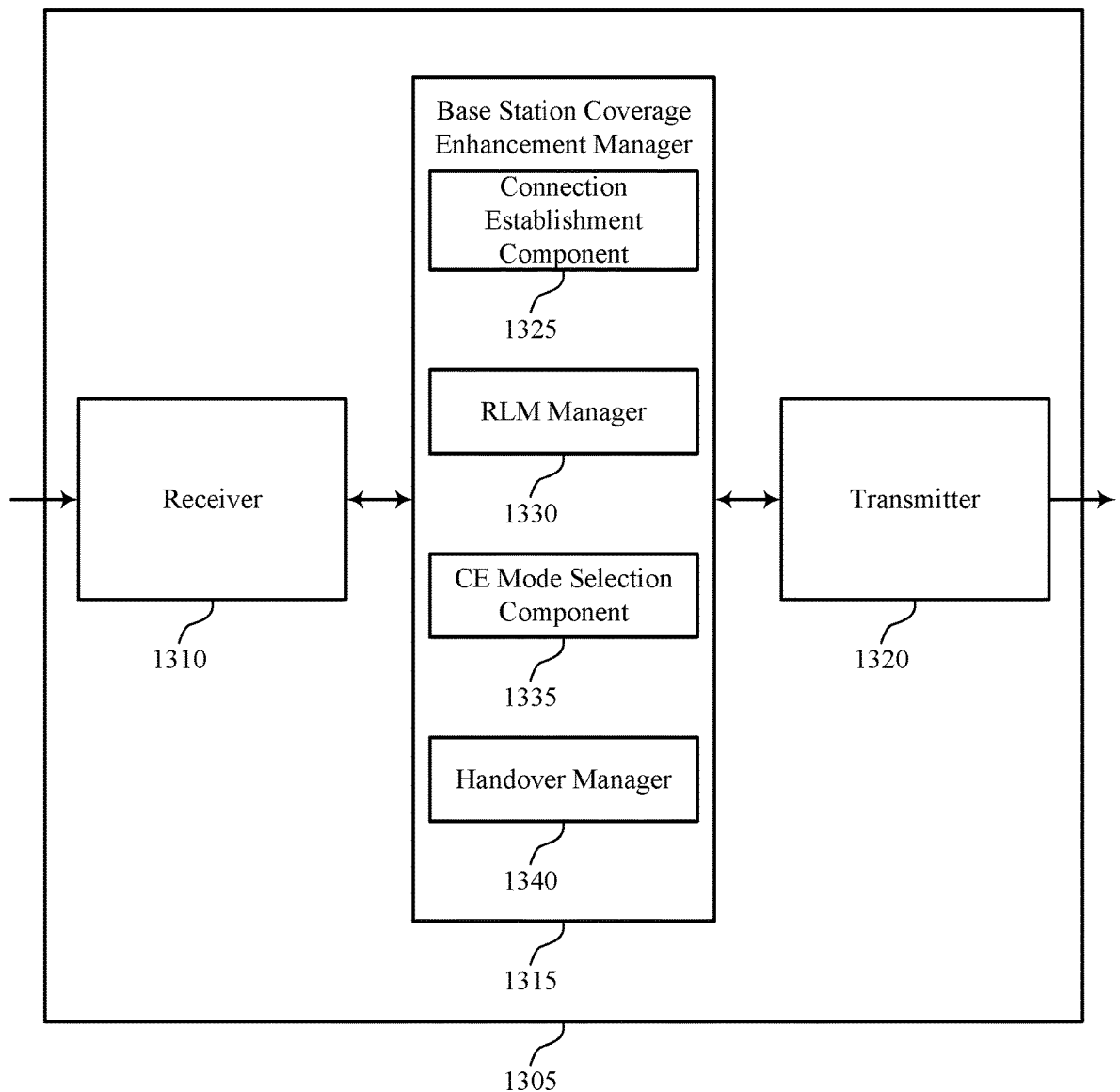

FIG. 13 shows a block diagram 1300 of a wireless device 1305 that supports coverage enhancement mode switching for wireless communications using shared radio frequency spectrum in accordance with aspects of the present disclosure. Wireless device 1305 may be an example of aspects of a wireless device 1205 or a base station 105 as described with reference to FIGS. 1 and 12. Wireless device 1305 may include receiver 1310, base station coverage enhancement manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to coverage enhancement mode switching for wireless communications using shared radio frequency spectrum, etc.). Information may be passed on to other components of the device. The receiver 1310 may be an example of aspects of the transceiver 1535 described with reference to FIG. 15. The receiver 1310 may utilize a single antenna or a set of antennas.

Base station coverage enhancement manager 1315 may be an example of aspects of the base station coverage enhancement manager 1515 described with reference to FIG. 15. Base station coverage enhancement manager 1315 may also include connection establishment component 1325, RLM manager 1330, CE mode selection component 1335, and handover manager 1340.

Connection establishment component 1325 may establish, at a base station, a connection with a UE according to a non-coverage enhancement (non-CE) mode and establish, at a first base station, a first connection with a UE according to a coverage enhancement (CE) mode or a non-CE mode.

RLM manager 1330 may receive, from the UE, an indication of a channel quality of a radio link between the UE and the base station. In some cases, RLM manager 1330 may receive, from the UE, an indication of a channel quality of a radio link with the base station and one or more channel quality measurements for one or more neighboring base stations. RLM manager 1330 may also determine that the channel quality of the radio link is below a threshold value. In some cases, the receiving the indication of the channel quality includes receiving a measurement report that includes measurements associated with one or more of non-CE mode transmissions or CE mode transmissions of the base station. In some cases, the measurement report is provided to the base station periodically or based on a trigger transmitted from the base station. In some cases, the measurement report includes both CE mode measurements based on a first measurement window associated with CE mode transmissions and non-CE mode measurements based on a second measurement window associated with non-CE mode transmissions. In some cases, the non-CE mode measurements have an associated first threshold value for switching from the non-CE mode to the CE mode, and the CE mode measurements have an associated second threshold value for switching from the CE mode to the non-CE mode.

CE mode selection component 1335 may determine that the channel quality of the radio link is below a threshold value, transmit an indication to the UE to reestablish the connection using a coverage enhancement (CE) mode based on the determining. CE mode selection component 1335 may also transmit an uplink grant for an uplink transmission using the CE mode, where the uplink grant is transmitted using both non-CE and CE control resources until a RRC reconfiguration complete message is received from the UE. CE mode selection component 1335 may also determine, based on the one or more channel quality measurements for the one or more neighboring base stations, whether to indicate the CE mode or non-CE mode for the second connection with a neighboring base station following a handover.

Handover manager 1340 may transmit a handover command to the UE to establish a second connection with the second base station, the handover command indicating a CE mode or non-CE mode for the second connection.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
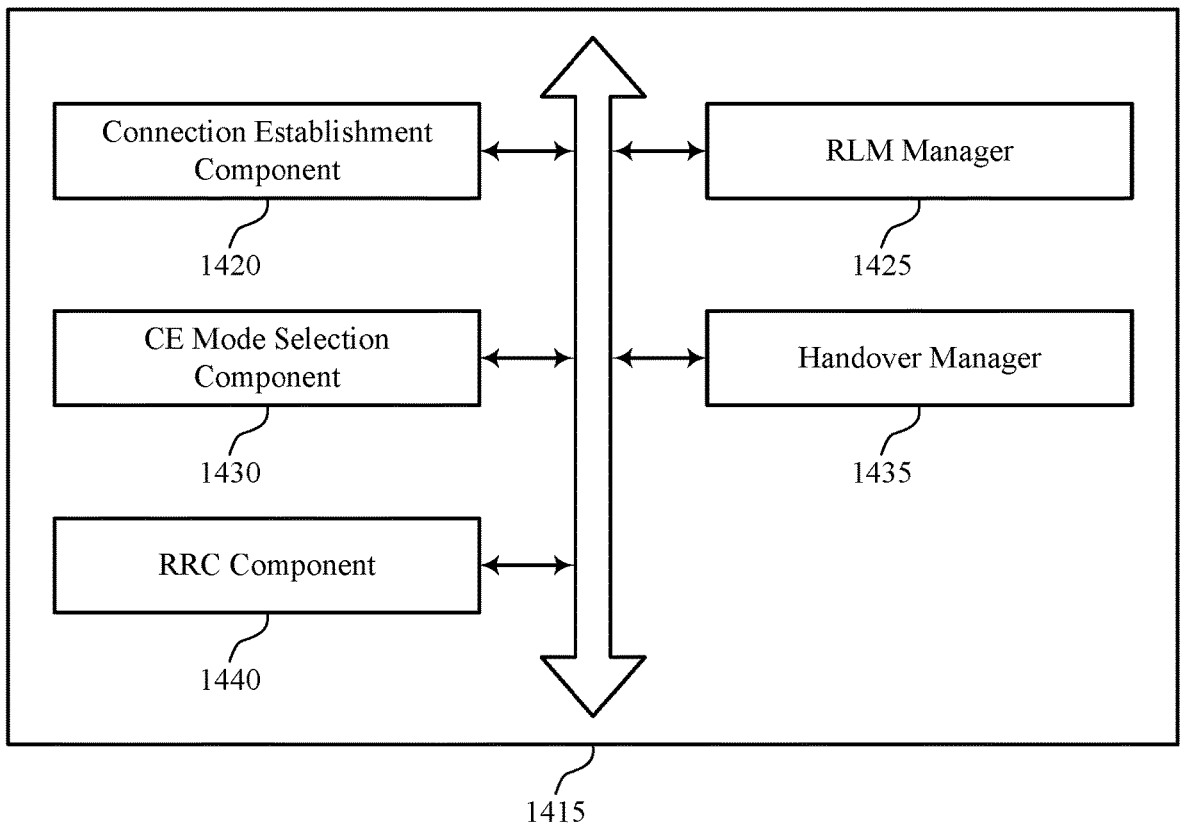

FIG. 14 shows a block diagram 1400 of a base station coverage enhancement manager 1415 that supports coverage enhancement mode switching for wireless communications using shared radio frequency spectrum in accordance with aspects of the present disclosure. The base station coverage enhancement manager 1415 may be an example of aspects of a base station coverage enhancement manager 1515 described with reference to FIGS. 12, 13, and 15. The base station coverage enhancement manager 1415 may include connection establishment component 1420, RLM manager 1425, CE mode selection component 1430, handover manager 1435, and RRC component 1440. Each of these modules may communicate, directly or indirectly, with one another (e.g., via one or more buses).

Connection establishment component 1420 may establish, at a base station, a connection with a UE according to a non-coverage enhancement (non-CE) mode and establish, at a first base station, a first connection with a UE according to a coverage enhancement (CE) mode or a non-CE mode.

RLM manager 1425 may receive, from the UE, an indication of a channel quality of a radio link between the UE and the base station. In some cases, RLM manager 1425 may receive, from the UE, an indication of a channel quality of a radio link with the base station and one or more channel quality measurements for one or more neighboring base stations. RLM manager 1425 may also determine that the channel quality of the radio link is below a threshold value. In some cases, the receiving the indication of the channel quality includes receiving a measurement report that includes measurements associated with one or more of non-CE mode transmissions or CE mode transmissions of the base station. In some cases, the measurement report is provided to the base station periodically or based on a trigger transmitted from the base station. In some cases, the measurement report includes both CE mode measurements based on a first measurement window associated with CE mode transmissions and non-CE mode measurements based on a second measurement window associated with non-CE mode transmissions. In some cases, the non-CE mode measurements have an associated first threshold value for switching from the non-CE mode to the CE mode, and the CE mode measurements have an associated second threshold value for switching from the CE mode to the non-CE mode.

CE mode selection component 1430 may determine that the channel quality of the radio link is below a threshold value, transmit an indication to the UE to reestablish the connection using a coverage enhancement (CE) mode based on the determining. CE mode selection component 1430 may also transmit an uplink grant for an uplink transmission using the CE mode, where the uplink grant is transmitted using both non-CE and CE control resources until a RRC reconfiguration complete message is received from the UE. CE mode selection component 1430 may also determine, based on the one or more channel quality measurements for the one or more neighboring base stations, whether to indicate the CE mode or non-CE mode for the second connection with a neighboring base station following a handover.

Handover manager 1435 may transmit a handover command to the UE to establish a second connection with the second base station, the handover command indicating a CE mode or non-CE mode for the second connection.

RRC component 1440 may transmit a RRC reconfiguration message to reconfigure the connection using the CE mode, and receive a RRC reconfiguration complete message from the UE upon completion of the RRC reconfiguration. In some cases, the transmitting includes transmitting a RRC reconfiguration message to the UE to establish a new connection with the base station using the CE mode.

Figure 15:
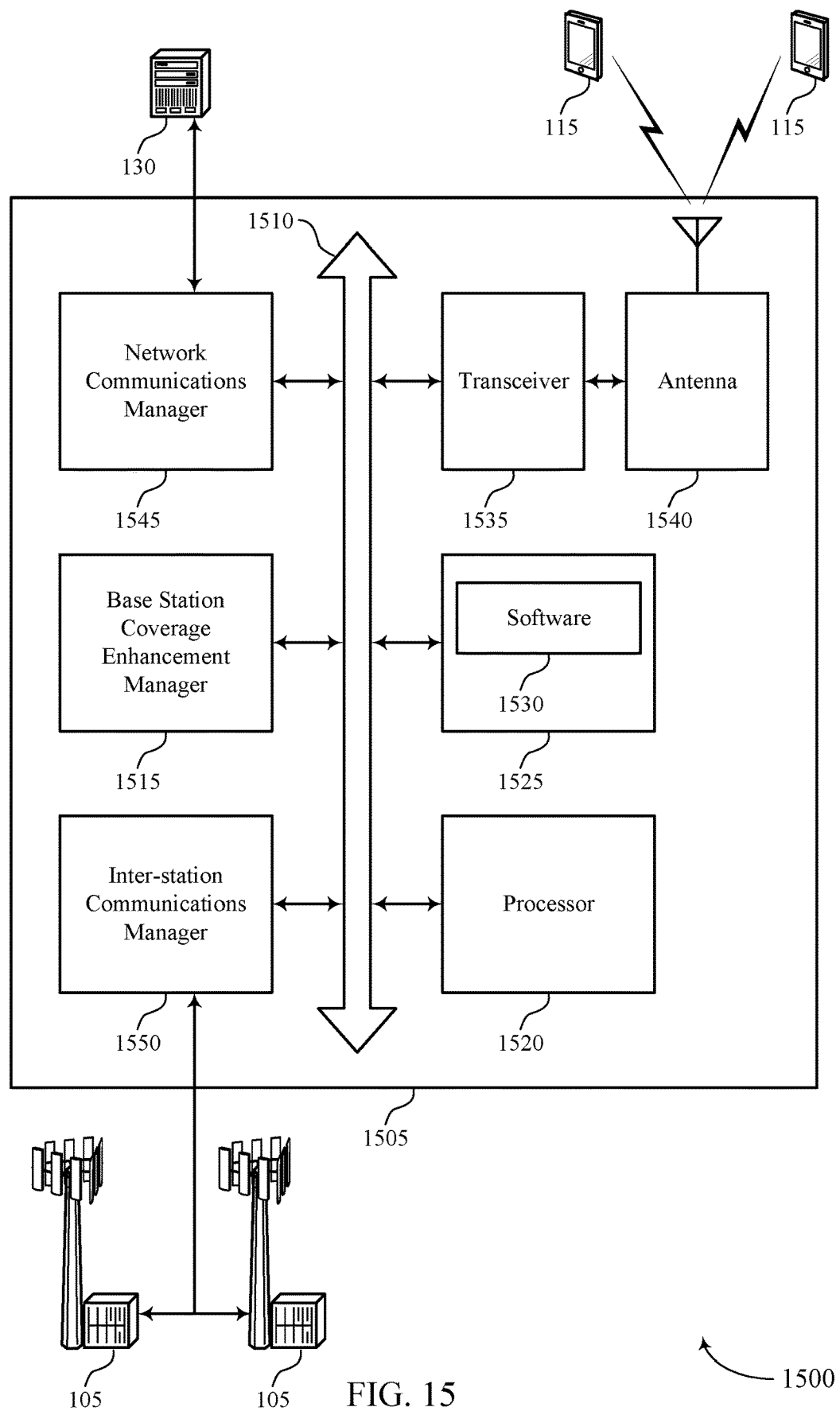
FIG. 15 illustrates a block diagram of a system including a base station that supports coverage enhancement mode switching for wireless communications using shared radio frequency spectrum in accordance with aspects of the present disclosure.

FIG. 15 shows a diagram of a system 1500 including a device 1505 that supports coverage enhancement mode switching for wireless communications using shared radio frequency spectrum in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station coverage enhancement manager 1515, processor 1520, memory 1525, software 1530, transceiver 1535, antenna 1540, network communications manager 1545, and inter-station communications manager 1550. These components may be in electronic communication via one or more busses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting coverage enhancement mode switching for wireless communications using shared radio frequency spectrum).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support coverage enhancement mode switching for wireless communications using shared radio frequency spectrum. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an Long Term Evolution (LTE)/LTE-A wireless communication network technology to provide communication between base stations 105.

Figure 16:
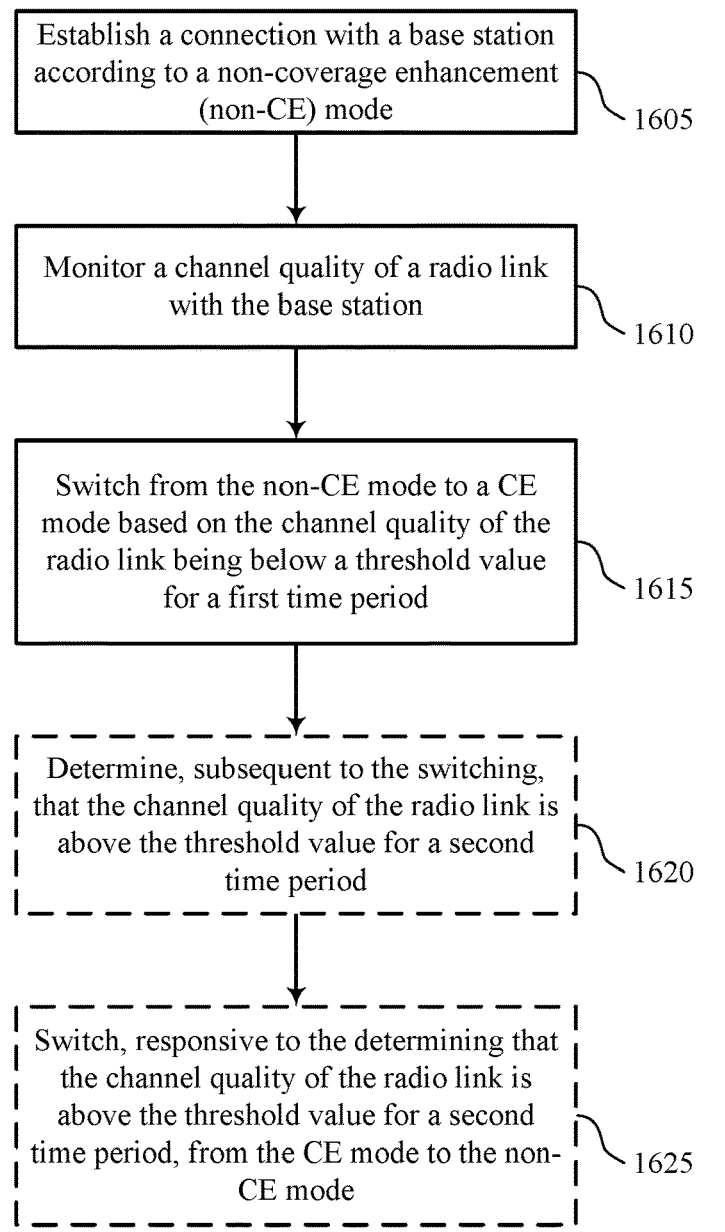
FIGS. 16 through 21 illustrate methods for coverage enhancement mode switching for wireless communications using shared radio frequency spectrum in accordance with aspects of the present disclosure.

FIG. 16 shows a flowchart illustrating a method 1600 for coverage enhancement mode switching for wireless communications using shared radio frequency spectrum in accordance with aspects of the present disclosure. The operations of method 1600 may be implemented by a UE 115 or its components as described herein. For example, the operations of method 1600 may be performed by a UE coverage enhancement manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may establish a connection with a base station according to a non-coverage enhancement (non-CE) mode. The operations of block 1605 may be performed according to the methods described with reference to FIGS. 1 through 7. In certain examples, aspects of the operations of block 1605 may be performed by a connection establishment component as described with reference to FIGS. 8 through 11.

At block 1610 the UE 115 may monitor a channel quality of a radio link with the base station. The operations of block 1610 may be performed according to the methods described with reference to FIGS. 1 through 7. In certain examples, aspects of the operations of block 1610 may be performed by a RLM manager as described with reference to FIGS. 8 through 11.

At block 1615 the UE 115 may switch from the non-CE mode to a CE mode based at least in part on the channel quality of the radio link being below a threshold value for a first time period. The operations of block 1615 may be performed according to the methods described with reference to FIGS. 1 through 7. In certain examples, aspects of the operations of block 1615 may be performed by a CE mode selection component as described with reference to FIGS. 8 through 11.

At optional block 1620 the UE 115 may determine, subsequent to the switching, that the channel quality of the radio link is above the threshold value for a second time period. The operations of block 1620 may be performed according to the methods described with reference to FIGS. 1 through 7. In certain examples, aspects of the operations of block 1620 may be performed by a RLM manager as described with reference to FIGS. 8 through 11.

At optional block 1625 the UE 115 may switch, responsive to the determining that the channel quality of the radio link is above the threshold value for a second time period, from the CE mode to the non-CE mode. The operations of block 1625 may be performed according to the methods described with reference to FIGS. 1 through 7. In certain examples, aspects of the operations of block 1625 may be performed by a CE mode selection component as described with reference to FIGS. 8 through 11.

Figure 17:
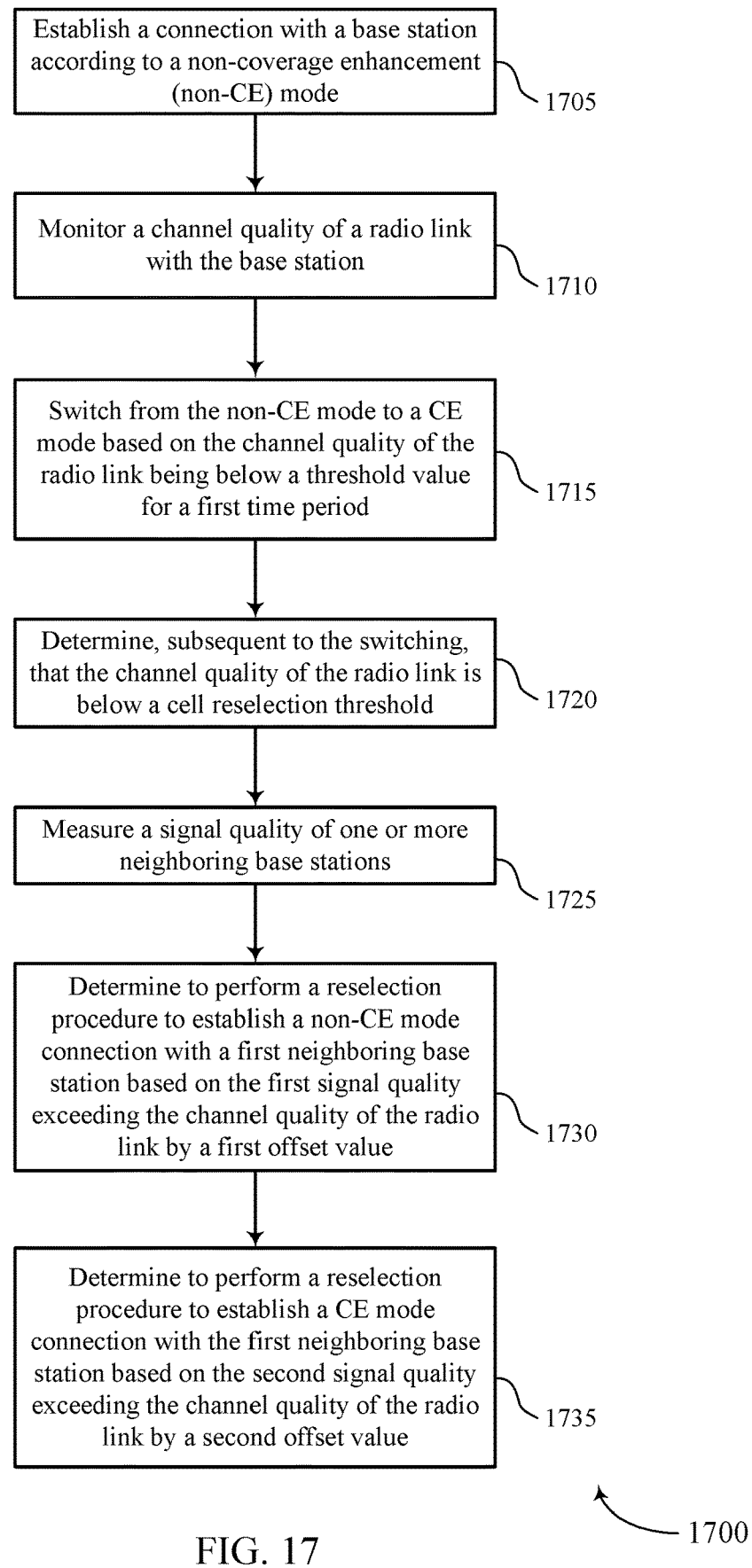

FIG. 17 shows a flowchart illustrating a method 1700 for coverage enhancement mode switching for wireless communications using shared radio frequency spectrum in accordance with aspects of the present disclosure. The operations of method 1700 may be implemented by a UE 115 or its components as described herein. For example, the operations of method 1700 may be performed by a UE coverage enhancement manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may establish a connection with a base station according to a non-coverage enhancement (non-CE) mode. The operations of block 1705 may be performed according to the methods described with reference to FIGS. 1 through 7. In certain examples, aspects of the operations of block 1705 may be performed by a connection establishment component as described with reference to FIGS. 8 through 11.

At block 1710 the UE 115 may monitor a channel quality of a radio link with the base station. The operations of block 1710 may be performed according to the methods described with reference to FIGS. 1 through 7. In certain examples, aspects of the operations of block 1710 may be performed by a RLM manager as described with reference to FIGS. 8 through 11.

At block 1715 the UE 115 may switch from the non-CE mode to a CE mode based at least in part on the channel quality of the radio link being below a threshold value for a first time period. The operations of block 1715 may be performed according to the methods described with reference to FIGS. 1 through 7. In certain examples, aspects of the operations of block 1715 may be performed by a CE mode selection component as described with reference to FIGS. 8 through 11.

At block 1720 the UE 115 may determine, subsequent to the switching, that the channel quality of the radio link is below a cell reselection threshold. The operations of block 1720 may be performed according to the methods described with reference to FIGS. 1 through 7. In certain examples, aspects of the operations of block 1720 may be performed by a handover manager as described with reference to FIGS. 8 through 11.

At block 1725 the UE 115 may measure a signal quality of one or more neighboring base stations. The operations of block 1725 may be performed according to the methods described with reference to FIGS. 1 through 7. In certain examples, aspects of the operations of block 1725 may be performed by a handover manager as described with reference to FIGS. 8 through 11.

At block 1730 the UE 115 may determine to perform a reselection procedure to establish a non-CE mode connection with a first neighboring base station based at least in part on the first signal quality exceeding the channel quality of the radio link by a first offset value. The operations of block 1730 may be performed according to the methods described with reference to FIGS. 1 through 7. In certain examples, aspects of the operations of block 1730 may be performed by a handover manager as described with reference to FIGS. 8 through 11.

At block 1735 the UE 115 may determine to perform a reselection procedure to establish a CE mode connection with the first neighboring base station based at least in part on the second signal quality exceeding the channel quality of the radio link by a second offset value. The operations of block 1735 may be performed according to the methods described with reference to FIGS. 1 through 7. In certain examples, aspects of the operations of block 1735 may be performed by a handover manager as described with reference to FIGS. 8 through 11.

Figure 18:
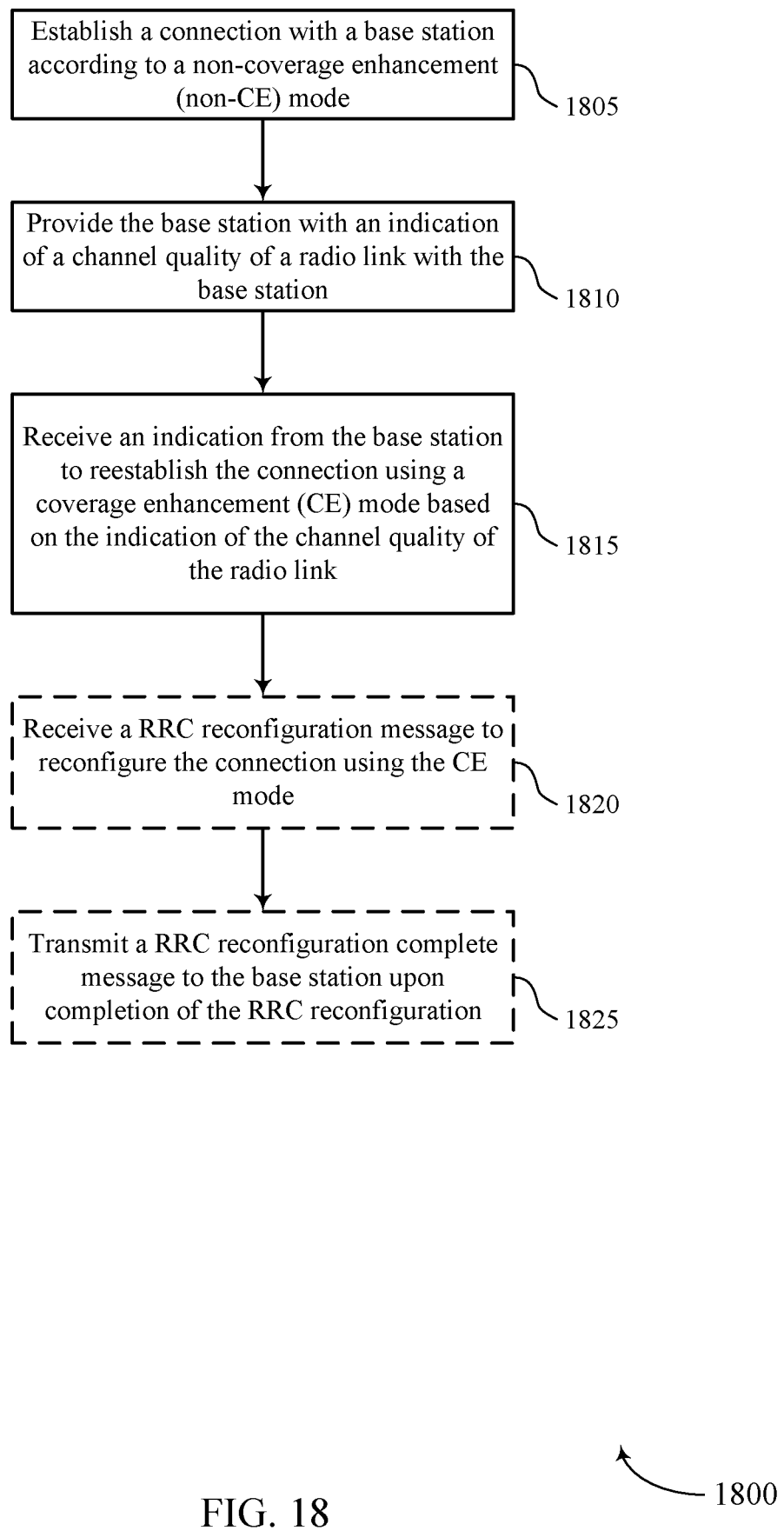

FIG. 18 shows a flowchart illustrating a method 1800 for coverage enhancement mode switching for wireless communications using shared radio frequency spectrum in accordance with aspects of the present disclosure. The operations of method 1800 may be implemented by a UE 115 or its components as described herein. For example, the operations of method 1800 may be performed by a UE coverage enhancement manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may establish a connection with a base station according to a non-coverage enhancement (non-CE) mode. The operations of block 1805 may be performed according to the methods described with reference to FIGS. 1 through 7. In certain examples, aspects of the operations of block 1805 may be performed by a connection establishment component as described with reference to FIGS. 8 through 11.

At block 1810 the UE 115 may provide the base station with an indication of a channel quality of a radio link with the base station. The operations of block 1810 may be performed according to the methods described with reference to FIGS. 1 through 7. In certain examples, aspects of the operations of block 1810 may be performed by a RLM manager as described with reference to FIGS. 8 through 11.

At block 1815 the UE 115 may receive an indication from the base station to reestablish the connection using a coverage enhancement (CE) mode based at least in part on the indication of the channel quality of the radio link. The operations of block 1815 may be performed according to the methods described with reference to FIGS. 1 through 7. In certain examples, aspects of the operations of block 1815 may be performed by a CE mode selection component as described with reference to FIGS. 8 through 11.

At optional block 1820 the UE 115 may receive a radio resource control (RRC) reconfiguration message to reconfigure the connection using the CE mode. The operations of block 1820 may be performed according to the methods described with reference to FIGS. 1 through 7. In certain examples, aspects of the operations of block 1820 may be performed by a RRC component as described with reference to FIGS. 8 through 11.

At optional block 1825 the UE 115 may transmit a RRC reconfiguration complete message to the base station upon completion of the RRC reconfiguration. The operations of block 1825 may be performed according to the methods described with reference to FIGS. 1 through 7. In certain examples, aspects of the operations of block 1825 may be performed by a RRC component as described with reference to FIGS. 8 through 11.

Figure 19:
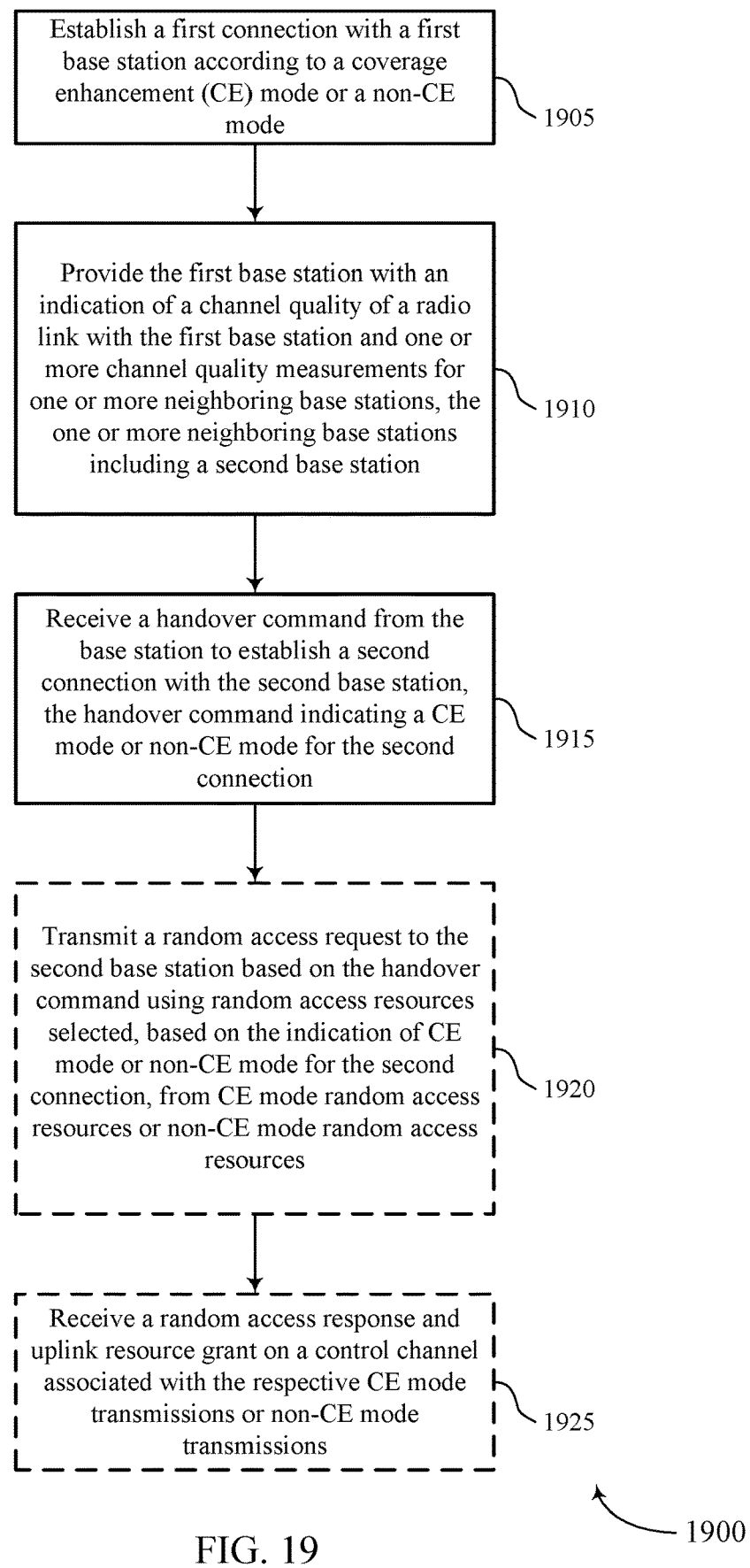

FIG. 19 shows a flowchart illustrating a method 1900 for coverage enhancement mode switching for wireless communications using shared radio frequency spectrum in accordance with aspects of the present disclosure. The operations of method 1900 may be implemented by a UE 115 or its components as described herein. For example, the operations of method 1900 may be performed by a UE coverage enhancement manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may establish a first connection with a first base station according to a coverage enhancement (CE) mode or a non-CE mode. The operations of block 1905 may be performed according to the methods described with reference to FIGS. 1 through 7. In certain examples, aspects of the operations of block 1905 may be performed by a connection establishment component as described with reference to FIGS. 8 through 11.

At block 1910 the UE 115 may provide the first base station with an indication of a channel quality of a radio link with the first base station and one or more channel quality measurements for one or more neighboring base stations, the one or more neighboring base stations including a second base station. The operations of block 1910 may be performed according to the methods described with reference to FIGS. 1 through 7. In certain examples, aspects of the operations of block 1910 may be performed by a RLM manager as described with reference to FIGS. 8 through 11.

At block 1915 the UE 115 may receive a handover command from the base station to establish a second connection with the second base station, the handover command indicating a CE mode or non-CE mode for the second connection. The operations of block 1915 may be performed according to the methods described with reference to FIGS. 1 through 7. In certain examples, aspects of the operations of block 1915 may be performed by a handover manager as described with reference to FIGS. 8 through 11.

At optional block 1920 the UE 115 may transmit a random access request to the second base station based at least in part on the handover command using random access resources selected, based at least in part on the indication of CE mode or non-CE mode for the second connection, from CE mode random access resources or non-CE mode random access resources. The operations of block 1920 may be performed according to the methods described with reference to FIGS. 1 through 7. In certain examples, aspects of the operations of block 1920 may be performed by a random access manager as described with reference to FIGS. 8 through 11.

At optional block 1925 the UE 115 may receive a random access response and uplink resource grant on a control channel associated with the respective CE mode transmissions or non-CE mode transmissions. The operations of block 1925 may be performed according to the methods described with reference to FIGS. 1 through 7. In certain examples, aspects of the operations of block 1925 may be performed by a random access manager as described with reference to FIGS. 8 through 11.

Figure 20:
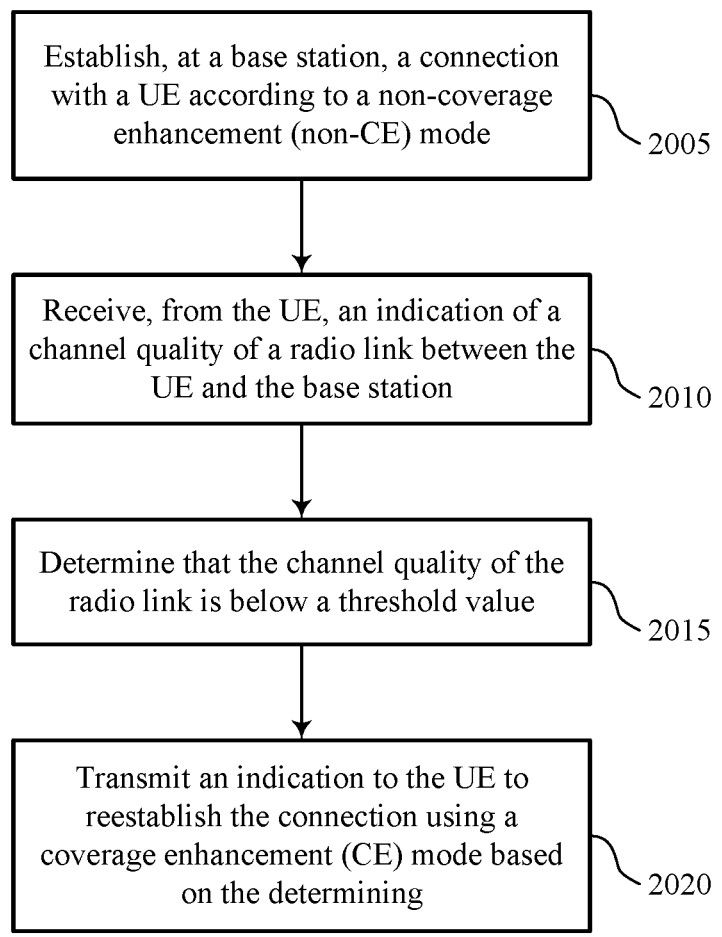

FIG. 20 shows a flowchart illustrating a method 2000 for coverage enhancement mode switching for wireless communications using shared radio frequency spectrum in accordance with aspects of the present disclosure. The operations of method 2000 may be implemented by a base station 105 or its components as described herein. For example, the operations of method 2000 may be performed by a base station coverage enhancement manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may establish a connection with a user equipment (UE) according to a non-coverage enhancement (non-CE) mode. The operations of block 2005 may be performed according to the methods described with reference to FIGS. 1 through 7. In certain examples, aspects of the operations of block 2005 may be performed by a connection establishment component as described with reference to FIGS. 12 through 15.

At block 2010 the base station 105 may receive, from the UE, an indication of a channel quality of a radio link between the UE and the base station. The operations of block 2010 may be performed according to the methods described with reference to FIGS. 1 through 7. In certain examples, aspects of the operations of block 2010 may be performed by a RLM manager as described with reference to FIGS. 12 through 15.

At block 2015 the base station 105 may determine that the channel quality of the radio link is below a threshold value. The operations of block 2015 may be performed according to the methods described with reference to FIGS. 1 through 7. In certain examples, aspects of the operations of block 2015 may be performed by a CE mode selection component as described with reference to FIGS. 12 through 15.

At block 2020 the base station 105 may transmit an indication to the UE to reestablish the connection using a coverage enhancement (CE) mode based at least in part on the determining. The operations of block 2020 may be performed according to the methods described with reference to FIGS. 1 through 7. In certain examples, aspects of the operations of block 2020 may be performed by a CE mode selection component as described with reference to FIGS. 12 through 15.

Figure 21:
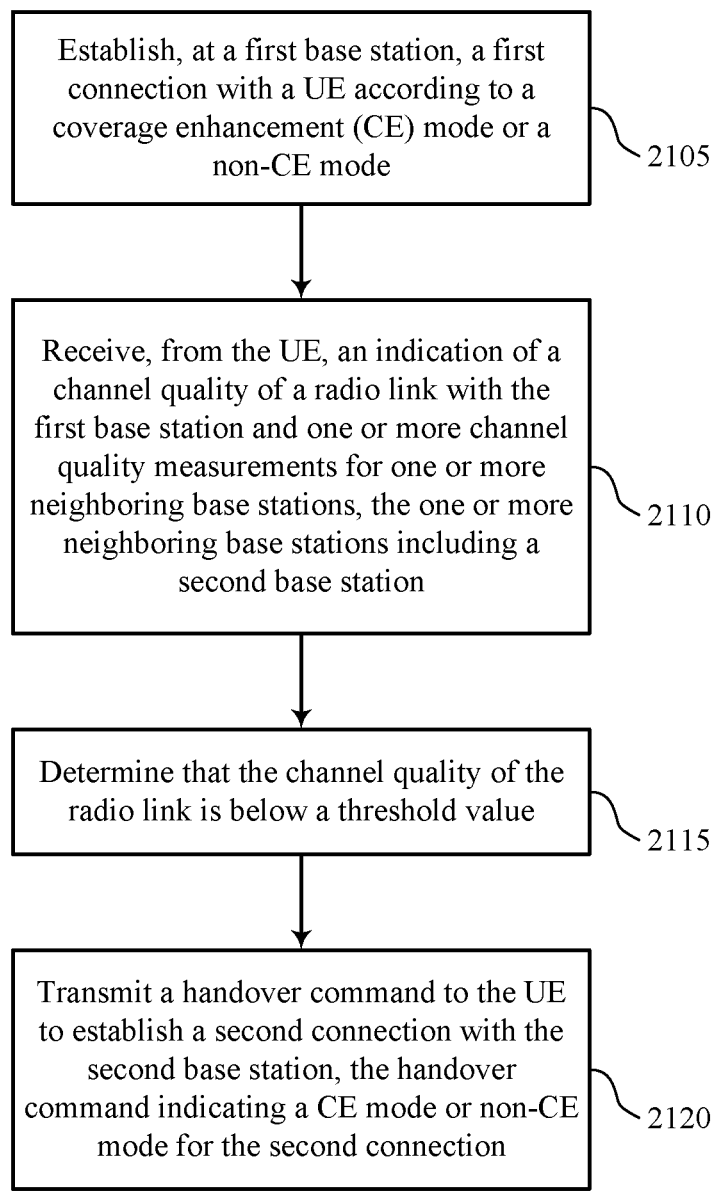

FIG. 21 shows a flowchart illustrating a method 2100 for coverage enhancement mode switching for wireless communications using shared radio frequency spectrum in accordance with aspects of the present disclosure. The operations of method 2100 may be implemented by a base station 105 or its components as described herein. For example, the operations of method 2100 may be performed by a base station coverage enhancement manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may establish, at a first base station, a first connection with a user equipment (UE) according to a coverage enhancement (CE) mode or a non-CE mode. The operations of block 2105 may be performed according to the methods described with reference to FIGS. 1 through 7. In certain examples, aspects of the operations of block 2105 may be performed by a connection establishment component as described with reference to FIGS. 12 through 15.

At block 2110 the base station 105 may receive, from the UE, an indication of a channel quality of a radio link with the first base station and one or more channel quality measurements for one or more neighboring base stations, the one or more neighboring base stations including a second base station. The operations of block 2110 may be performed according to the methods described with reference to FIGS. 1 through 7. In certain examples, aspects of the operations of block 2110 may be performed by a RLM manager as described with reference to FIGS. 12 through 15.

At block 2115 the base station 105 may determine that the channel quality of the radio link is below a threshold value. The operations of block 2115 may be performed according to the methods described with reference to FIGS. 1 through 7. In certain examples, aspects of the operations of block 2115 may be performed by a RLM manager as described with reference to FIGS. 12 through 15.

At block 2120 the base station 105 may transmit a handover command to the UE to establish a second connection with the second base station, the handover command indicating a CE mode or non-CE mode for the second connection. The operations of block 2120 may be performed according to the methods described with reference to FIGS. 1 through 7. In certain examples, aspects of the operations of block 2120 may be performed by a handover manager as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   establishing a connection with a base station according to a non-coverage enhancement (non-CE) mode;
   providing a measurement report to the base station that includes measurements associated with one or more of non-CE mode transmissions or CE mode transmissions of the base station, wherein the non-CE mode measurements have an associated first threshold value for switching from the non-CE mode to the CE mode, and the CE mode measurements have an associated second threshold value for switching from the CE mode to the non-CE mode;
   receiving a radio resource control (RRC) reconfiguration message from the base station to reconfigure the connection using a coverage enhancement (CE) mode based at least in part on the measurement report; and
   transmitting a RRC reconfiguration complete message to the base station upon completion of the RRC reconfiguration.

2. The method of claim 1, wherein the measurement report includes both CE mode measurements based at least in part on a first measurement window associated with CE mode transmissions and non-CE mode measurements based at least in part on a second measurement window associated with non-CE mode transmissions.

3. The method of claim 1, wherein the measurement report is provided to the base station periodically or based on a trigger received from the base station.

4. An apparatus for wireless communication, comprising:
   means for establishing a connection with a base station according to a non-coverage enhancement (non-CE) mode;
   means for providing a measurement report to the base station that includes measurements associated with one or more of non-CE mode transmissions or CE mode transmissions of the base station, wherein the non-CE mode measurements have an associated first threshold value for switching from the non-CE mode to the CE mode, and the CE mode measurements have an associated second threshold value for switching from the CE mode to the non-CE mode;

means for receiving a radio resource control (RRC) reconfiguration message from the base station to reconfigure the connection using a coverage enhancement (CE) mode based at least in part on the measurement report; and means for transmitting a RRC reconfiguration complete message to the base station upon completion of the RRC reconfiguration.

5. The apparatus of claim 4, wherein the measurement report includes both CE mode measurements based at least in part on a first measurement window associated with CE mode transmissions and non-CE mode measurements based at least in part on a second measurement window associated with non-CE mode transmissions.

6. The apparatus of claim 4, wherein the measurement report is provided to the base station periodically or based on a trigger received from the base station.

7. An apparatus for wireless communication, in a system comprising:
    a processor;
    memory in electronic communication with the processor; and
    instructions stored in the memory and operable, when executed by the processor, to cause the apparatus to:
        establish a connection with a base station according to a non-coverage enhancement (non-CE) mode;
        provide a measurement report to the base station that includes measurements associated with one or more of non-CE mode transmissions or CE mode transmissions of the base station, wherein the non-CE mode measurements have an associated first threshold value for switching from the non-CE mode to the CE mode, and the CE mode measurements have an associated second threshold value for switching from the CE mode to the non-CE mode;
        receive a radio resource control (RRC) reconfiguration message from the base station to reconfigure the connection using a coverage enhancement (CE) mode based at least in part on the measurement report; and
        transmit a RRC reconfiguration complete message to the base station upon completion of the RRC reconfiguration.

8. The apparatus of claim 7, wherein the measurement report includes both CE mode measurements based at least in part on a first measurement window associated with CE mode transmissions and non-CE mode measurements based at least in part on a second measurement window associated with non-CE mode transmissions.

9. The apparatus of claim 7, wherein the measurement report is provided to the base station periodically or based on a trigger received from the base station.

10. A non-transitory computer readable medium storing code for wireless communication, the code comprising instructions executable by a processor to:
    establish a connection with a base station according to a non-coverage enhancement (non-CE) mode;
    provide a measurement report to the base station that includes measurements associated with one or more of non-CE mode transmissions or CE mode transmissions of the base station, wherein the non-CE mode measurements have an associated first threshold value for switching from the non-CE mode to the CE mode, and the CE mode measurements have an associated second threshold value for switching from the CE mode to the non-CE mode;
    receive a radio resource control (RRC) reconfiguration message from the base station to reconfigure the connection using a coverage enhancement (CE) mode based at least in part on the measurement report; and
    transmit a RRC reconfiguration complete message to the base station upon completion of the RRC reconfiguration.

11. The non-transitory computer readable medium of claim 10, wherein the measurement report includes both CE mode measurements based at least in part on a first measurement window associated with CE mode transmissions and non-CE mode measurements based at least in part on a second measurement window associated with non-CE mode transmissions.

12. The non-transitory computer readable medium of claim 10, wherein the measurement report is provided to the base station periodically or based on a trigger received from the base station.

* * * * *